United States Patent
Maruyama et al.

(10) Patent No.: US 8,786,314 B2
(45) Date of Patent: Jul. 22, 2014

(54) CONTACTLESS POWER TRANSFER SYSTEM AND CONTROL METHOD THEREOF

(75) Inventors: Kouji Maruyama, Hino (JP); Akio Toba, Hino (JP); Ayako Ichinose, Hino (JP); Michio Tamate, Hino (JP)

(73) Assignee: Fuji Electric Co., Ltd., Kawasaki-Shi (JP)

( * ) Notice: Subject to any disclaimer, the term of this patent is extended or adjusted under 35 U.S.C. 154(b) by 274 days.

(21) Appl. No.: 13/299,351

(22) Filed: Nov. 17, 2011

(65) Prior Publication Data

US 2012/0127765 A1 May 24, 2012

(30) Foreign Application Priority Data

Nov. 18, 2010 (JP) ................................. 2010-257809
Sep. 16, 2011 (JP) ................................. 2011-203097

(51) Int. Cl.
*H02M 7/217* (2006.01)

(52) U.S. Cl.
USPC ........................................................ 326/127

(58) Field of Classification Search
USPC .................. 363/37, 44, 52, 84, 125, 126, 127
See application file for complete search history.

(56) References Cited

U.S. PATENT DOCUMENTS

| 4,953,068 | A * | 8/1990 | Henze .............................. 363/17 |
| 6,301,128 | B1 * | 10/2001 | Jang et al. ........................ 363/17 |
| 2010/0259955 | A1 * | 10/2010 | Shimada .......................... 363/49 |
| 2011/0149622 | A1 * | 6/2011 | Lin ................................ 363/124 |

FOREIGN PATENT DOCUMENTS

JP 2002-354711 A 12/2002

* cited by examiner

*Primary Examiner* — Nguyen Tran
(74) *Attorney, Agent, or Firm* — Rabin & Berdo, P.C.

(57) ABSTRACT

A contactless power transfer system, including a coil configured to supply or receive power contactlessly via magnetic coupling, a bridge circuit having two direct current (DC) terminals and two alternating current (AC) terminals, and a smoothing capacitor connected between the DC terminals. A load is connectable to either end of the smoothing capacitor. One of the AC terminals is connected to one end of the coil via a first capacitor. The other of the AC terminals is connected to the other end of the coil. The bridge circuit includes two serially-connected circuits each having upper and lower arms, each arm having a semiconductor switch and a diode in reverse parallel connection. A second capacitor is connected in parallel to the semiconductor switch of an upper arm, or of a lower arm, or to two semiconductor switches respectively of an upper arm and of a lower arms, of the bridge circuit.

18 Claims, 27 Drawing Sheets

PRIOR ART

US 8,786,314 B2

CONTACTLESS POWER TRANSFER SYSTEM AND CONTROL METHOD THEREOF

This application is based on and claims the benefit of priority under 35 U.S.C. §119 from Japanese Patent Application Nos. 2010-257809 and 2011-203097, respectively filed on Nov. 18, 2010 and Sep. 16, 2011, the contents of which are incorporated herein by reference.

BACKGROUND OF THE INVENTION

1. Technical Field

The present invention relates to a contactless power transfer system and control method thereof that supply power mainly across a space, utilizing magnetic coupling in a contactless condition between coils.

2. Related Art

A contactless power transfer system supplies power to a load utilizing magnetic coupling between coils caused by electromagnetic induction. The principle thereof is that a sort of transformer is formed by magnetically coupling plural coils across a space, and power is supplied and received utilizing the electromagnetic induction between the coils.

For example, by disposing a primary side coil corresponding to a power supply source in a rail form as a feeder wire, configuring a moving body by integrating a secondary side coil and power receiving circuit, and causing the primary side coil and secondary side coil to oppose each other, it is possible to contactlessly transfer power to the moving body moving along the feeder wire.

Herein, FIG. 27 shows a heretofore known technology of a contactless power transfer system described in JP-A-2002-354711 (especially, paragraphs [0028] to [0031] and to [0045], FIGS. 1, 6, and the like). In FIG. 27, a primary side feeder wire 110 acting as a coil is connected to either end of a high frequency power source 100. A power receiving coil 120 is magnetically coupled to the primary side feeder wire 110, and the primary side feeder wire 110 and power receiving coil 120 configure one kind of transformer.

Both ends of the power receiving coil 120 are connected to alternating current terminals of a full-wave rectifier circuit 10 via a resonant capacitor C. Herein, the power receiving coil 120 and resonant capacitor C configure a series resonance circuit.

The full-wave rectifier circuit 10 is configured by bridge connecting diodes $D_u$, $D_v$, $D_x$, and $D_y$.

A constant voltage control circuit 20, which controls in such a way that the direct current output voltage of the full-wave rectifier circuit 10 is of a reference voltage value, is connected to direct current terminals of the full-wave rectifier circuit 10. The constant voltage control circuit 20 is configured of a boost chopper circuit formed from, for example, a reactor $L_1$, a diode $D_1$, a smoothing capacitor $C_0$, and a semiconductor switch $SW_1$. Also, a load R is connected to either end of the smoothing capacitor $C_0$.

A control device for switching the semiconductor switch $SW_1$ is omitted from FIG. 27.

With the heretofore known technology of FIG. 27, a high frequency current is caused to flow along the primary side feeder wire 110 by the high frequency power source 100, and the high frequency power supplied is input into the full-wave rectifier circuit 10 via the power receiving coil 120, and converted into direct current power.

Generally, with this kind of contactless power transfer system, the voltage induced in the power receiving coil 120 changes due to a change in length of the gap between the primary side feeder wire 110 and power receiving coil 120, and due to positional deviations of the two, because of which the direct current output voltage of the full-wave rectifier circuit 10 fluctuates. The characteristics of the load R are also a cause of the direct current output voltage of the full-wave rectifier circuit 10 fluctuating.

For this reason, with the heretofore known technology of FIG. 27, the direct current output voltage of the full-wave rectifier circuit 10 is controlled to a constant value by the constant voltage control circuit 20.

For a contactless power transfer system, the higher the frequency of the current supplied via the coil, the lower the exciting inductance needed for carrying out a power transmission, and it is possible to miniaturize the coil and a core disposed in the periphery thereof. However, for a power converter configuring a high frequency power source device or a power receiving circuit, as the frequency of the current flowing through the circuit increases, the switching loss of the semiconductor switch increases, and the power transfer efficiency decreases, meaning that it is common to set the frequency of the contactlessly fed power between a few kilohertz and a few tens of kilohertz.

The contactless power transfer system shown in FIG. 27, and in particular the power receiving circuit after the resonant capacitor C, has the following problems.

1. As the power receiving circuit is configured of the full-wave rectifier circuit 10 and constant voltage control circuit 20, the circuit as a whole increases in size, which leads to an increase in installation space and an increase in cost.

2. As loss also occurs in the reactor $L_1$, semiconductor switch $SW_1$, and diode $D_1$, in addition to in the diodes $D_u$, $D_v$, $D_x$, and $D_y$ of the full-wave rectifier circuit 10, these losses cause a decrease in power transfer efficiency.

SUMMARY OF THE INVENTION

Therefore, an object of the invention is to provide a contactless power transfer system that enables a miniaturization and the reduction in cost of the circuit.

Also, another object of the invention is to provide a contactless power transfer system and control method thereof that reduce loss caused by the circuit elements, and carry out a highly efficient, stable power transfer.

In order to achieve the objects, a contactless power transfer system according to an aspect of the invention includes a power receiving coil that supplies and receives power contactlessly via magnetic coupling with a primary side feeder wire connected to an alternating current power source, and a power receiving circuit connected to the power receiving coil via a capacitor, wherein direct current voltage is supplied to a load from the power receiving circuit.

Herein, the power receiving circuit includes a bridge circuit including plural series circuits including upper and lower arms and having a reverse parallel connection circuit of a semiconductor switch and a diode in each of the upper and lower arms, and a smoothing capacitor, and in an aspect of the invention, a capacitor is connected in parallel to the semiconductor switch of either the upper arms or the lower arms, or to the semiconductor switches of both the upper and lower arms, of the bridge circuit.

As a control method of the contactless power transfer system, all of the semiconductor switches are put into an off condition during a period for which the power transfer to the power receiving coil is stopped due to a power outage, or the like, and a switching action of each semiconductor switch is carried out after a zero-crossing of the current of the power receiving coil is detected when the power transfer is started.

As another control method, the semiconductor switch of the upper armor lower arm may be put into an on condition during a period for which the power transfer to the power receiving coil is stopped, and a switching action of each semiconductor switch carried out after a zero-crossing of the current of the power receiving coil is detected when the power transfer is started.

Also, as another control method, all of the semiconductor switches may be maintained in the switching condition immediately before the current of the power receiving coil becomes zero due to the stopping of the power transfer to the power receiving coil during a period for which the power transfer to the power receiving coil is stopped, and a switching action of each semiconductor switch carried out after a zero-crossing of the current of the power receiving coil is detected when the power transfer to the power receiving coil is started.

Also, as another example of the contactless power transfer system according to an aspect of the invention, the bridge circuit may be configured of a switching arm series circuit wherein two switching arms formed from a reverse parallel connection circuit of a semiconductor switch and diode are connected in series, and a diode series circuit wherein two diodes are connected in series. In this case, a connection point of the switching arms and a connection point of the diodes form alternating current terminals of the bridge circuit, and a connection point of the switching arm series circuit and diode series circuit forms direct current terminals of the bridge circuit.

In this contactless power transfer system, a capacitor may be connected in parallel to at least one of the semiconductor switches.

As a control method of the contactless power transfer system, all of the semiconductor switches are put into an off condition during a period for which the power transfer to the power receiving coil is stopped, and a switching action of each semiconductor switch is carried out after a zero-crossing of the current of the power receiving coil is detected when the power transfer is started.

As another control method, all of the semiconductor switches may be maintained in the switching condition immediately before the current of the power receiving coil becomes zero due to the stopping of the power transfer to the power receiving coil during a period for which the power transfer to the power receiving coil is stopped, and a switching action of each semiconductor switch may be carried out after a zero-crossing of the current of the power receiving coil is detected when the power transfer is started.

Also, as another example of the contactless power transfer system according to an aspect of the invention, resonant capacitors may be embedded in the bridge circuit in the power receiving circuit configured of a switching arm series circuit wherein two switching arms formed from a reverse parallel connection circuit of a semiconductor switch and a diode are connected in series, and a capacitor series circuit wherein two resonant capacitors are connected in series, connected in parallel. In this case, a connection point of the switching arms and a connection point of the resonant capacitors form alternating current terminals of the bridge circuit, and a connection point of the switching arm series circuit and capacitor series circuit form direct current terminals of the bridge circuit.

In this contactless power transfer system, a capacitor may be connected in parallel to at least one of the semiconductor switches.

As a control method of the contactless power transfer system, all the semiconductor switches are put into an off condition during a period for which the power transfer to the power receiving coil is stopped, and a switching action of each semiconductor switch is carried out after a zero-crossing of the current of the power receiving coil is detected when the power transfer is started.

As another control method, all of the semiconductor switches may be maintained in the switching condition immediately before the current of the power receiving coil becomes zero due to the stopping of the power transfer to the power receiving coil during a period for which the power transfer to the power receiving coil is stopped, and a switching action of each semiconductor switch may be carried out after a zero-crossing of the current of the power receiving coil is detected when the power transfer is started.

According to the invention, it is possible to control the direct current output voltage to a constant by a phase control of drive signals of the semiconductor switches configuring the bridge circuit inside the power receiving circuit, without using a constant voltage control circuit as with the heretofore known technology. That is, as the power receiving circuit can be configured of only the bridge circuit and a smoothing capacitor, it is possible to achieve a simplification, miniaturization, and reduction in cost of the circuit configuration. At the same time, it is possible to reduce loss by reducing the number of circuit components, enabling a highly efficient, stable contactless power transfer.

DETAILED DESCRIPTION OF THE EMBODIMENTS

Figure 27:
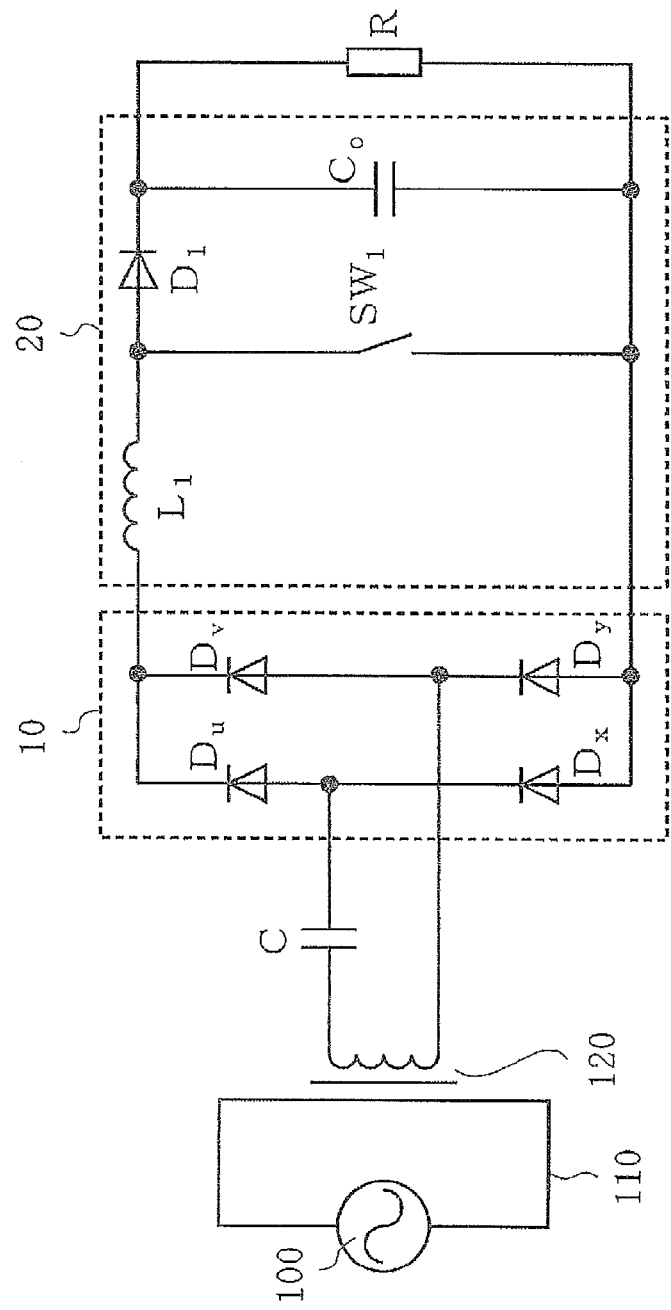
FIG. 27 is a circuit diagram of heretofore known technology described in JP-A-2002-354711 (paragraphs [0028] to [0031] and [0041] to [0045], FIGS. 1, 6, and the like).

Hereafter, a description will be given, based on the drawings, of embodiments of the invention. As it is mainly the configuration of a power receiving circuit connected to a stage subsequent to a power receiving coil 120 that differs from FIG. 27 in each embodiment, a description of each embodiment will be given hereafter centered on this point. Also, in each embodiment, circuit components having the same function as in FIG. 27 will be given the same reference numerals and characters.

Figure 1:
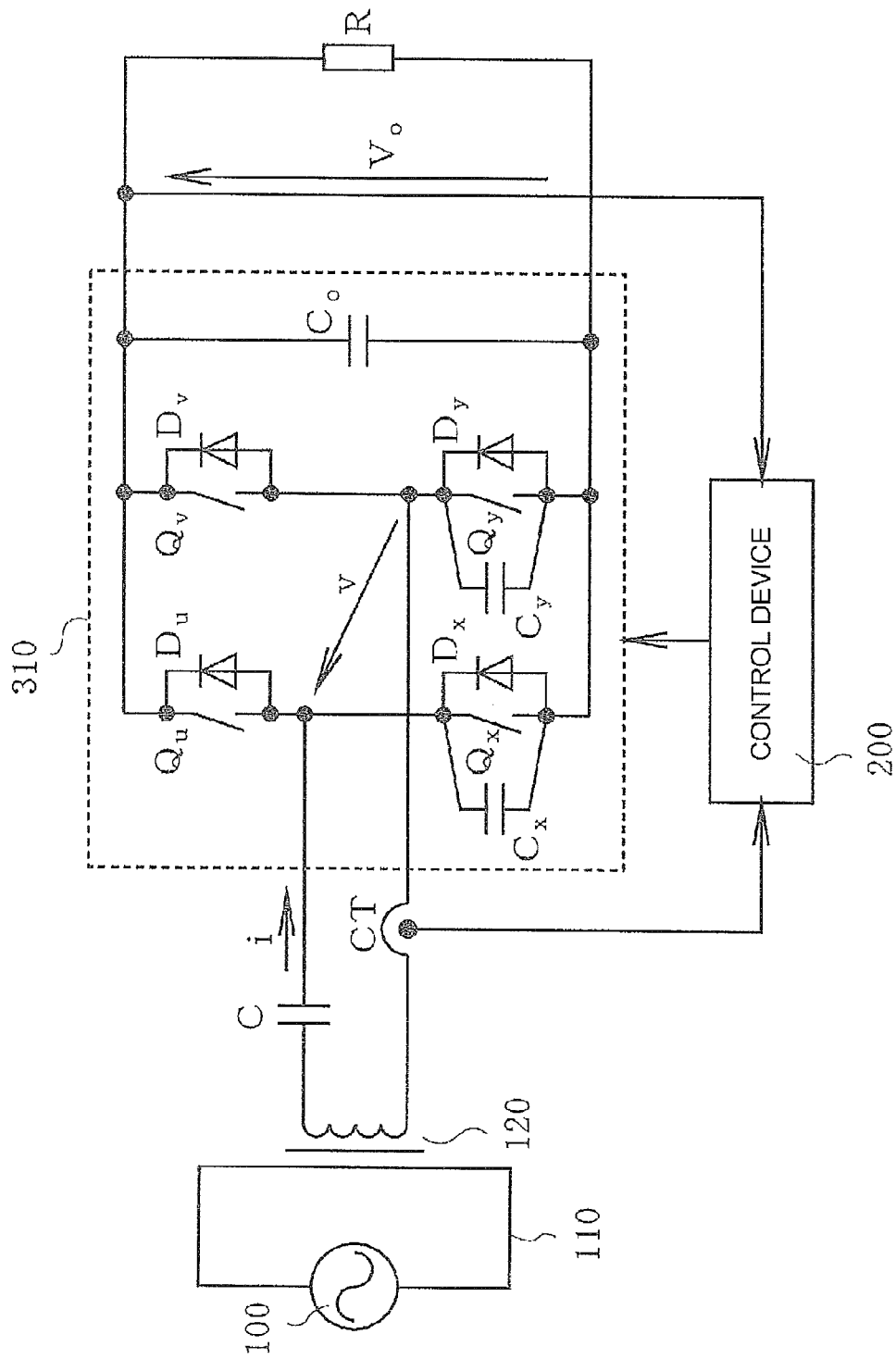
FIG. 1 is a circuit diagram showing a first embodiment of a contactless power transfer system according to the invention.

FIG. 1 is a circuit diagram showing a first embodiment of a contactless power transfer system according to the invention, and corresponds to a first aspect of the invention.

In FIG. 1, reference numeral 310 is a power receiving circuit. The power receiving circuit 310 includes bridge connected semiconductor switches $Q_u$, $Q_x$, $Q_v$, and $Q_y$, diodes $D_u$, $D_x$, $D_v$, and $D_y$ connected in reverse parallel to the switches $Q_u$, $Q_x$, $Q_v$, and $Q_y$ respectively, capacitors $C_x$ and $C_y$ connected in parallel to the lower arm switches $Q_x$ and $Q_y$ respectively, and a smoothing capacitor $C_0$ connected between direct current terminals of a bridge circuit (bridge inverter) formed from these elements. A series circuit of a resonant capacitor C and the power receiving coil 120 is connected between alternating current terminals of the bridge circuit, and a load R is connected to either end of the smoothing capacitor $C_0$.

Also, reference numeral 200 is a control device that generates a drive signal for switching the semiconductor switches $Q_u$, $Q_x$, $Q_v$, and $Q_y$. The control device 200 generates the drive signal based on current i of the power receiving coil 120 detected by a current detector unit CT and on a direct current output voltage Vo of the power receiving circuit 310.

Next, a description will be given of actions of the contactless power transfer system shown in FIG. 1 at a normal time.

The circuit shown in FIG. 1 is such that a bidirectional power supply is possible between the power receiving coil 120 and the load R. Hereafter, a description will be given of two kinds of circuit action, a case of supplying power from the power receiving coil 120 to the load R and a case of supplying power from the load R to the power receiving coil 120.

Firstly, a description will be given of the actions in the case of supplying power from the power receiving coil 120 to the load R.

Figure 2:
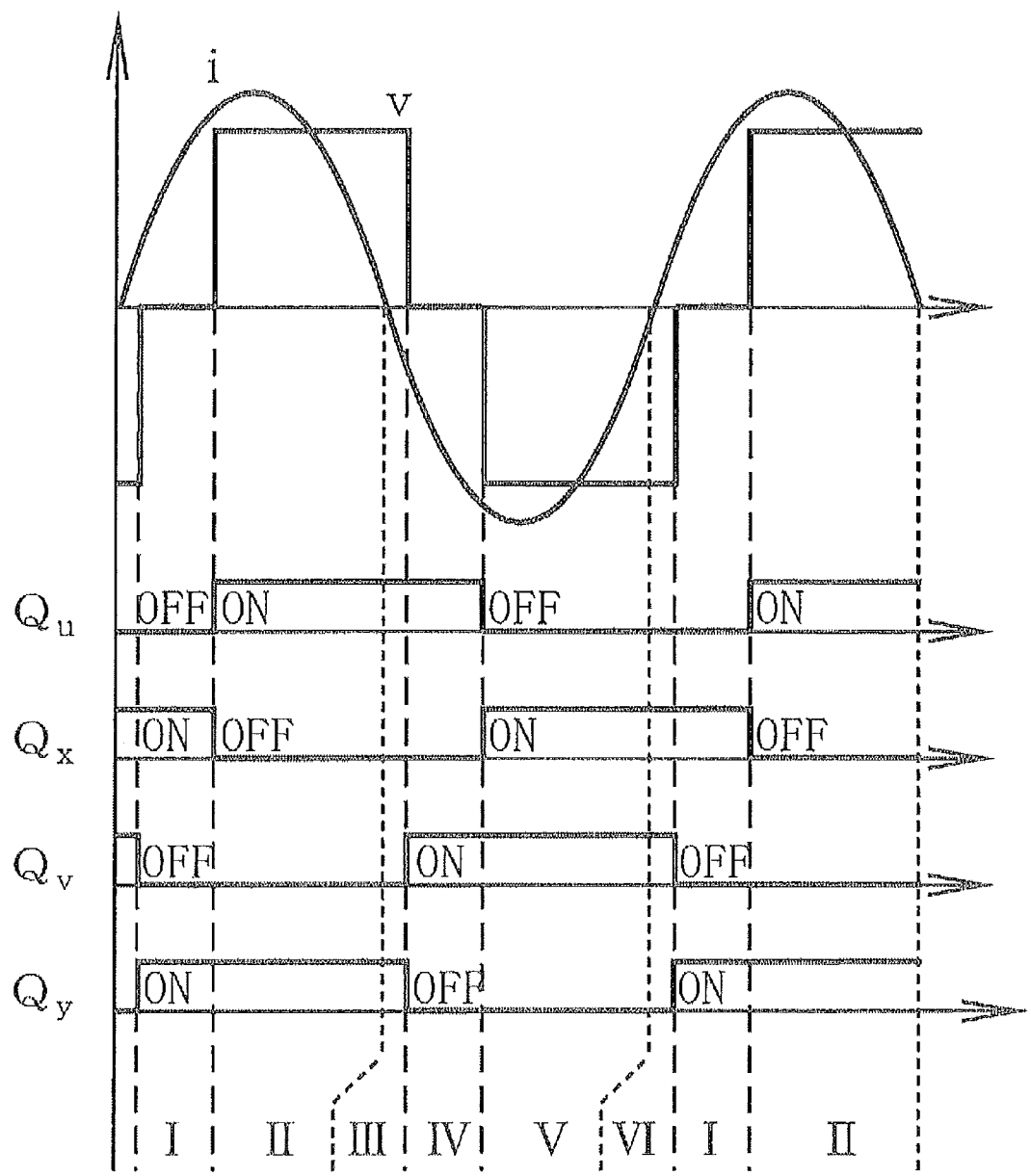
FIG. 2 is an operation illustration of FIG. 1.

FIG. 2 shows an operation waveform of the current i flowing through the power receiving coil 120 of FIG. 1 and of an alternating current voltage v of the bridge circuit, and shows drive signals of the semiconductor switches $Q_u$, $Q_x$, $Q_v$, and $Q_y$.

As shown in FIG. 2, the semiconductor switches $Q_u$, $Q_x$, $Q_v$, and $Q_y$ switch in a constant frequency in synchronization with the current i. Hereafter, a description will be given of an action in each period I to VI of FIG. 2.

1. Period I (switches $Q_x$ and $Q_y$ on): the current i of the power receiving coil 120 flows along a path from the resonant capacitor C through the switch $Q_x$ and diode $D_y$ to the power receiving coil 120, and the voltage v of the bridge circuit is at a zero voltage level, as shown in the drawing.

2. Period II (switches $Q_u$ and $Q_y$ on): the current i flows along a path from the resonant capacitor C through the diode $D_u$, smoothing capacitor $C_0$, and diode $D_y$ to the power receiving coil 120, and the voltage v is at a positive voltage level corresponding to the direct current output voltage $V_o$, as shown in FIG. 2. In this period, the smoothing capacitor $C_0$ is charged by the current i.

3. Period III (switches $Q_u$ and $Q_y$ on): in this period, the polarity of the current i is inverted, and the current i flows along a path from the resonant capacitor C through the power receiving coil 120, switch $Q_y$, and smoothing capacitor $C_0$ to the switch $Q_u$, and the smoothing capacitor $C_0$ is discharged.

4. Period IV (switches $Q_u$ and $Q_v$ on): the current i flows along a path from the resonant capacitor C through the power receiving coil 120 and diode $D_v$ to the switch $Q_u$, and the voltage v is at a zero voltage level, as shown in the drawing.

5. Period V (switches $Q_x$ and $Q_v$ on): the current i flows along a path from the resonant capacitor C through the power receiving coil 120, diode $D_v$, and smoothing capacitor $C_0$ to the diode $D_x$, and the voltage v is at a negative voltage level corresponding to the direct current output voltage $V_o$ as shown in the drawing. In this period, the smoothing capacitor $C_0$ is charged by the current i.

6. Period VI (switches $Q_x$ and $Q_v$ on): in this period, the polarity of the current i is inverted, and the current i flows along a path from the resonant capacitor C through the switch $Q_x$, smoothing capacitor $C_0$, and switch $Q_v$ to the power receiving coil 120, and the smoothing capacitor $C_0$ is discharged.

Subsequently, there is a transition to the switching mode of period I, and the same actions are repeated.

Next, a description will be given of the case of supplying power from the load R to the power receiving coil 120.

Figure 3:
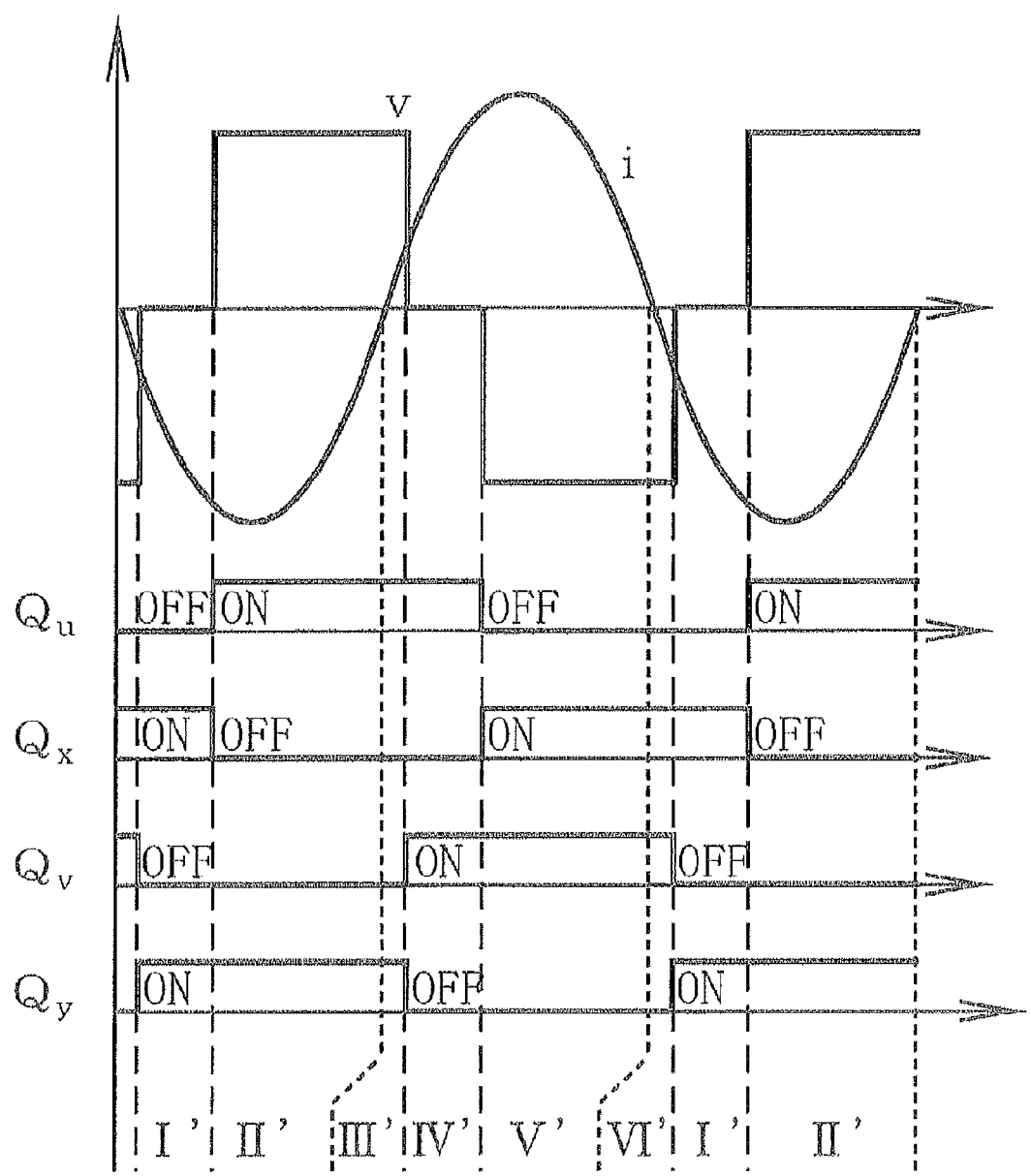
FIG. 3 is another operation illustration of FIG. 1.

FIG. 3, in the same way as FIG. 2, shows an operation waveform of the current i flowing through the power receiving coil 120 and of the alternating current voltage v of the bridge circuit, and drive signals of the semiconductor switches $Q_u$, $Q_x$, $Q_v$, and $Q_y$.

As shown in FIG. 3, the semiconductor switches $Q_u$, $Q_x$, $Q_v$, and $Q_y$ switch at a constant frequency in synchronization with the current i. The drive signals of the semiconductor switches $Q_u$, $Q_x$, $Q_v$, and $Q_y$ in FIG. 3 are signals deviating by a half cycle of the current i from the drive signals of the semiconductor switches $Q_u$, $Q_x$, $Q_v$, and $Q_y$ shown in FIG. 2. Hereafter, a description will be given of an action in each period I' to VI' of FIG. 3.

1. Period I' (switches $Q_x$ and $Q_y$ on): the current i of the power receiving coil 120 flows along a path from the resonant capacitor C through the power receiving coil 120 and switch $Q_y$ to the diode $D_x$, and the alternating current voltage v of the bridge circuit is at a zero voltage level, as shown in the drawing.

2. Period II' (switches $Q_u$ and $Q_y$ on): the current i flows along a path from the resonant capacitor C through the power receiving coil 120, switch $Q_y$, and smoothing capacitor $C_0$ to the switch $Q_u$, and the smoothing capacitor $C_0$ is discharged.

3. Period III' (switches $Q_u$ and $Q_y$ on): in this period, the polarity of the current i is inverted, and the current i flows along a path from the resonant capacitor C through the diode $D_u$, smoothing capacitor $C_0$, and diode $D_y$ to the power receiving coil 120, and the voltage v, continuing from period II', is at a positive voltage level corresponding to the direct current output voltage $V_o$. In this period, the smoothing capacitor $C_0$ is charged by the current i.

4. Period IV' (switches $Q_u$ and $Q_v$ on): the current i flows along a path from the resonant capacitor C through the diode $D_u$ and switch $Q_v$ to the power receiving coil 120, and the alternating current voltage v is at a zero voltage level, as shown in the drawing.

5. Period V' (switches $Q_x$ and $Q_v$ on): the current i flows along a path from the resonant capacitor C through the switch $Q_x$, smoothing capacitor $C_0$, and switch $Q_v$ to the power receiving coil 120, and the smoothing capacitor $C_0$ is discharged.

6. Period VI' (switches $Q_x$ and $Q_v$ on): in this period, the polarity of the current i is inverted, and the current i flows along a path from the resonant capacitor C through the power receiving coil 120, diode $D_v$ and smoothing capacitor $C_0$ to the diode $D_x$, and the voltage v, continuing from period V', is at a negative voltage level corresponding to the direct current output voltage $V_o$. In this period, the smoothing capacitor $C_0$ is charged by the current i.

Subsequently, there is a transition to the switching mode of period I', and the same actions are repeated.

By controlling the semiconductor switches $Q_u$, $Q_x$, $Q_v$, and $Q_y$ as heretofore described, the alternating current voltage v of the bridge circuit is controlled by positive and negative voltages with the direct current output voltage $V_o$ as a crest value. Power fed from a primary side feeder wire 110 to the power receiving circuit 310 is the product of the current i of the power receiving coil 120 and voltage v of the bridge circuit shown in FIG. 2, and control of the power fed, that is, a constant control of the direct current output voltage $V_o$ is enabled by the control device 200 adjusting the phases of the drive signals of the semiconductor switches $Q_u$, $Q_x$, $Q_v$, and $Q_y$ based on the detected value of the direct current output voltage $V_o$. Also, by configuring the power receiving circuit 310 with a bridge circuit, actions keeping the power constant are possible even when the load R is a regenerative load.

Furthermore, on/off actions of the semiconductor switches when there is a switching between the periods shown in FIGS. 2 and 3 are such that it is possible to carry out a so-called soft switching owing to the action of the capacitors $C_x$ and $C_y$ connected in parallel to the lower arm side semiconductor switches $Q_x$ and $Q_y$.

Figure 4:
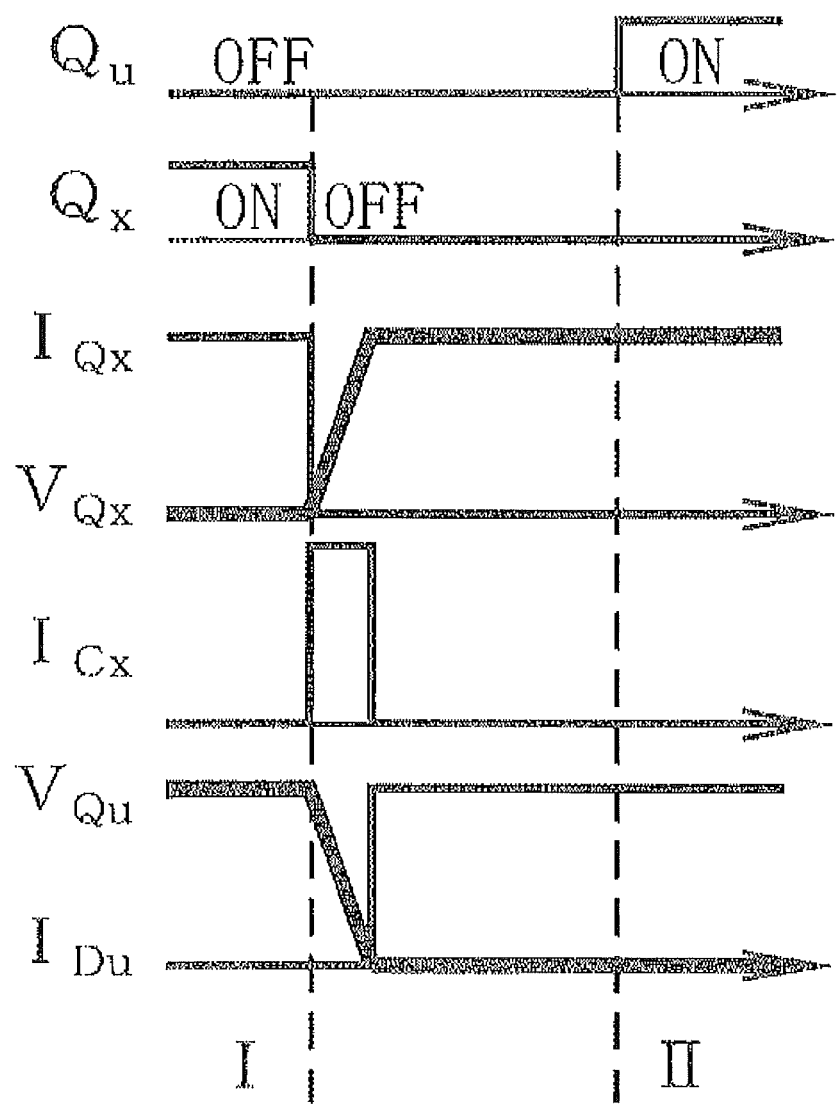
FIG. 4 is an operation illustration of a soft switching in a predetermined period of FIG. 2.

FIG. 4 shows operation waveforms of the semiconductor switches $Q_u$ and $Q_x$ when there is a shift from period I (switches $Q_x$ and $Q_y$ on) to period II (switches $Q_u$ and $Q_v$ on) of FIG. 2. In period I, the current i of the power receiving coil 120 flows through the switch $Q_x$ and, as a switching action switching to period II, the switch $Q_x$ turns off based on a drive signal output from the control device 200. At this time, the current i flows as a charging current of the capacitor $C_x$ connected in parallel to the switch $Q_x$, and the kind of delay shown in the drawing occurs in the rise of a voltage $V_{Qx}$ applied to the switch $Q_x$.

Because of this, the switch $Q_x$ is switched to zero voltage, and it is possible to reduce a loss accompanying the switching action. Also, after charging the capacitor $C_x$, the current is commutated to the upper arm side diode $D_u$. By providing a delay time of an off signal of the switch $Q_x$ so that a drive on signal to the switch $Q_u$ is input after the action of commutation to the diode $D_u$, no switching loss accompanying an on action of the switch $Q_u$ occurs.

A description has been given here with a time of switching from period I to period II as an example, but on/off actions of the semiconductor switches when there is a switching between other periods are also such that, in the same way, it is possible to carry out a zero voltage switching owing to the charging and discharging actions of the capacitors $C_x$ and $C_y$ connected in parallel to the switches $Q_x$ and $Q_y$.

Figure 5:
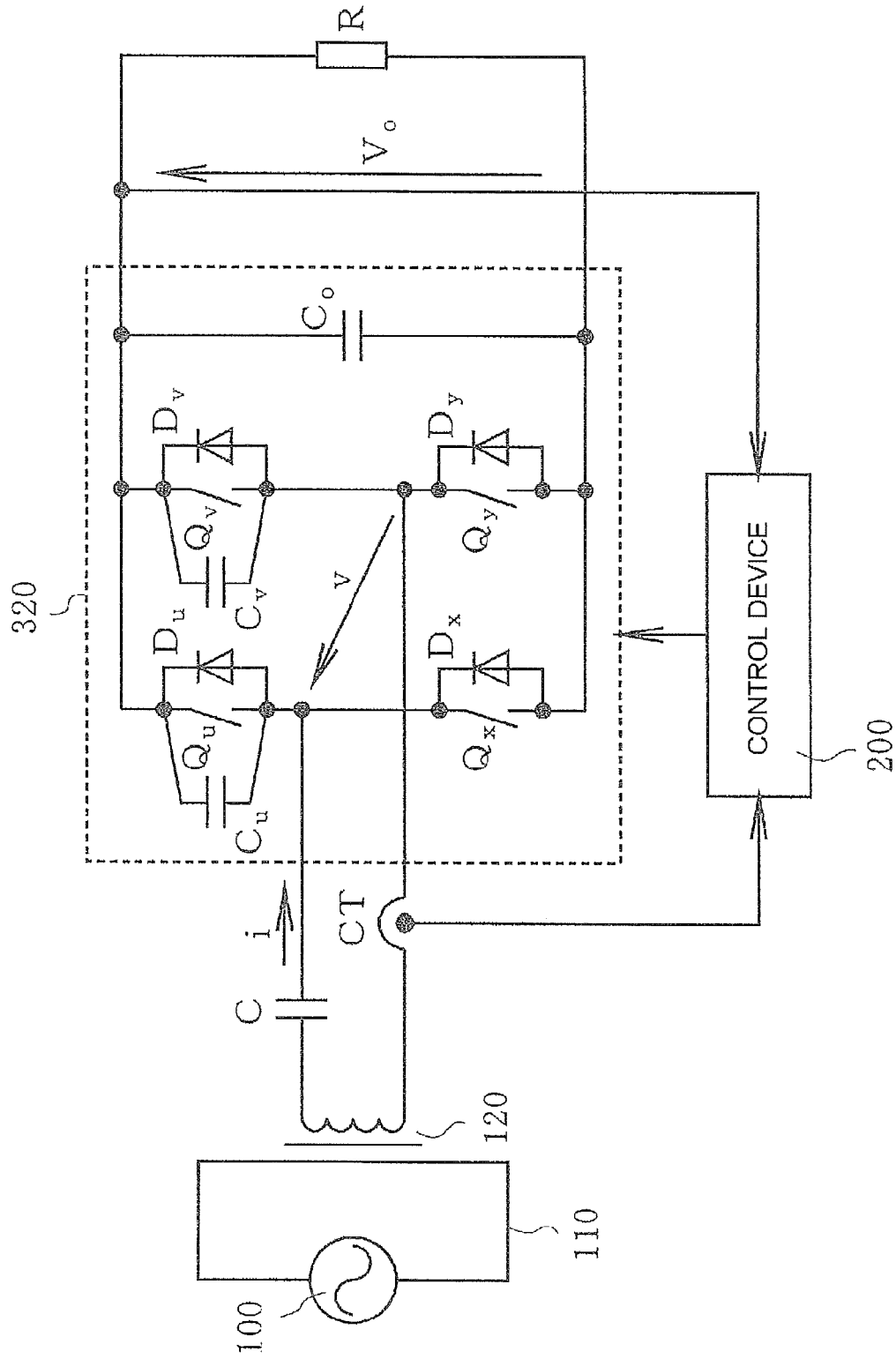
FIG. 5 is a circuit diagram showing a second embodiment of the contactless power transfer system according to the invention.
Figure 6:
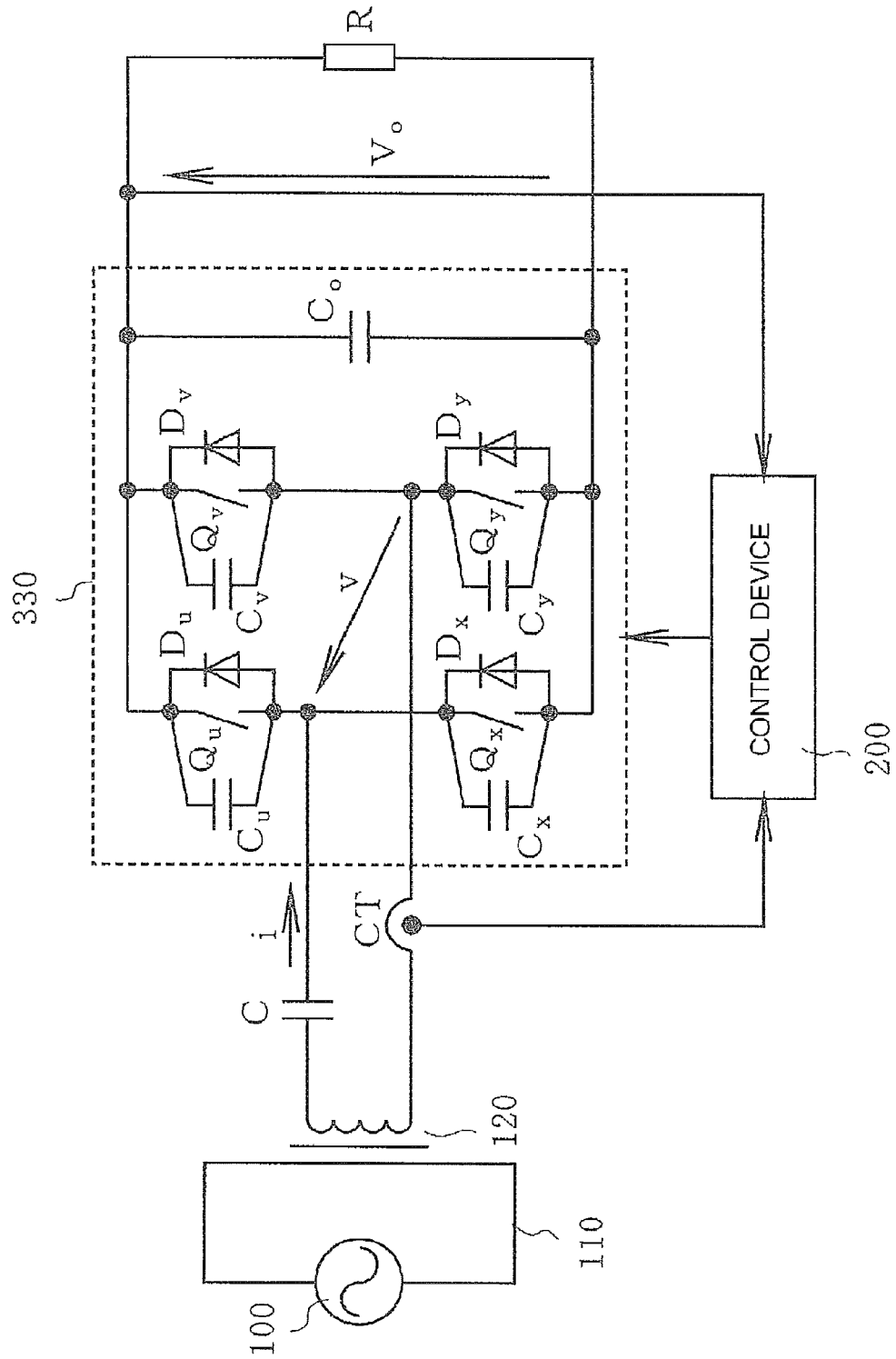
FIG. 6 is a circuit diagram showing a third embodiment of the contactless power transfer system according to the invention.

Also, as examples of capacitors being connected in parallel to semiconductor switches, capacitors may be connected to the upper arm side switches $Q_u$, and $Q_v$, as shown in a second embodiment of FIG. 5, or capacitors may be connected to all the upper and lower arm semiconductor switches $Q_u$, $Q_v$, $Q_x$, and $Q_y$, as shown in a third embodiment of FIG. 6. In these cases too, it is possible to carry out a zero voltage switching.

Next, a description will be given of a first embodiment of a control method according to the invention. Each embodiment of the control method described hereafter is an embodiment in a case in which the power transfer to the power receiving coil 120 is temporarily stopped because of a power outage or the like, and the power transfer subsequently restarted.

Figure 7:
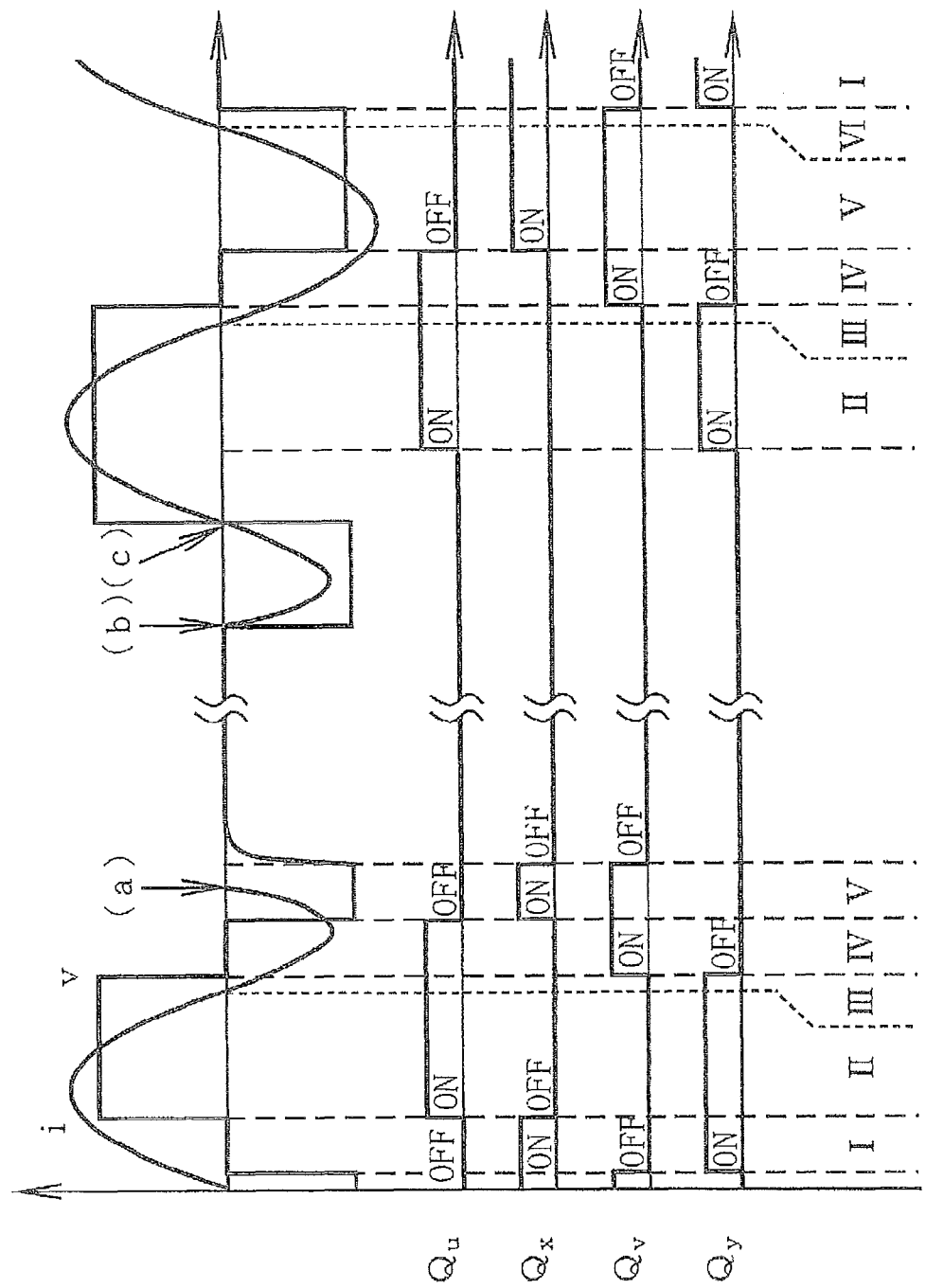
FIG. 7 is an operation illustration showing a first embodiment of a control method according to the invention.

FIG. 7 shows an operation waveform of the current i of the power receiving coil 120 and alternating current voltage v of the bridge circuit, and drive signals of the semiconductor switches $Q_u$, $Q_x$, $Q_v$, and $Q_y$, from a stoppage to a restart of the power transfer from the primary side feeder wire 110, with the circuit of FIG. 1 as a subject.

When the power transfer is stopped from a normal power transfer condition at a timing (a) of FIG. 7, a loss of the current i is detected by the current detection unit CT in FIG. 1, all the semiconductor switches $Q_u$, $Q_x$, $Q_v$, and $Q_y$ are put into an off condition, and that condition is maintained.

Next, on the power transfer being restarted at a timing (b) of FIG. 7, a voltage in accordance with a high frequency current of the primary side feeder wire 110 is induced in the power receiving coil 120. At this time, as all the semiconductor switches $Q_u$, $Q_x$, $Q_v$, and $Q_y$ are in an off condition as heretofore described, the bridge circuit inside the power receiving circuit 310 is equivalent to a diode full-wave rectifier circuit.

Because of this, a resonant current flows along a path from the power receiving coil 120 through the diode $D_v$, smoothing capacitor $C_o$, and diode $D_x$ to the resonant capacitor C in FIG. 1. The polarity of the current inverts at a timing (c) of FIG. 7, and the current flows along a path from the power receiving coil 120 through the resonant capacitor C, diode $D_u$, and smoothing capacitor $C_o$ to the diode $D_y$.

A zero-crossing of the current i at the timing (c) is detected by the current detector unit CT, and the control device 200 controls in such a way as to restart the switching action of each semiconductor switch.

Because of this, in the embodiment, the path of the resonant current flowing through the power receiving coil 120 when the power transfer is restarted is secured by temporarily carrying out a full-wave rectifying action with the diodes, and it is possible to restart normally by subsequently starting a desired switching action after the zero-crossing of the current i is detected.

The heretofore described circuit action is established under a condition whereby the power receiving coil induced voltage when the power transfer is restarted is greater than the direct current output voltage $V_o$ (the smoothing capacitor $C_0$ voltage). When the power receiving coil induced voltage when the power transfer is restarted is smaller than the direct current output voltage $V_o$ because of the characteristics of the connected load R, it is possible to carry out a restarting action using the following second embodiment and third embodiment.

Figure 8:
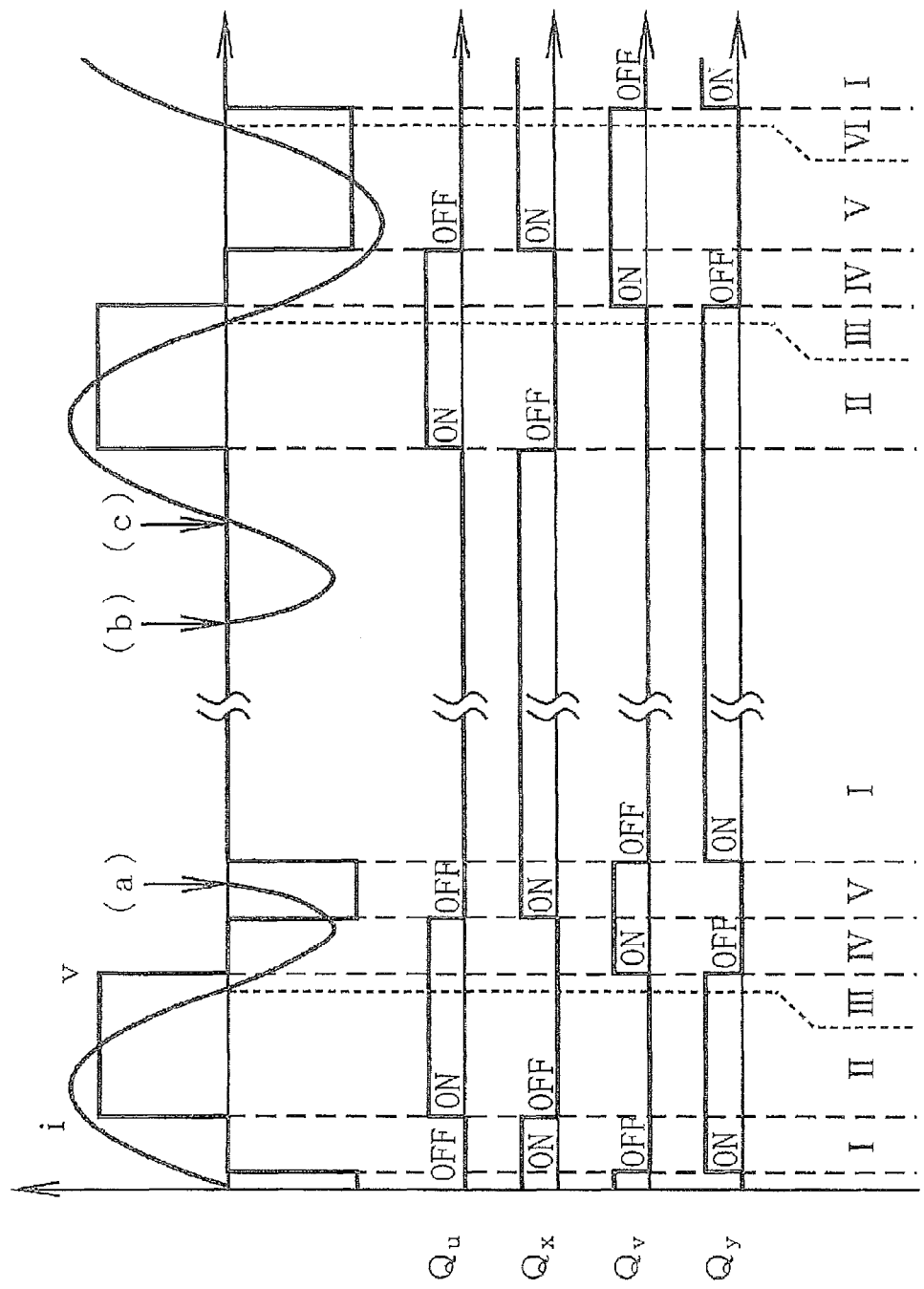
FIG. 8 is an operation illustration showing a second embodiment of the control method according to the invention.

FIG. 8 is an operation illustration showing a second embodiment of the control method according to the invention and, in the same way as FIG. 7, shows an operation waveform of the current i and voltage v, and drive signals of the semiconductor switches $Q_u$, $Q_x$, $Q_v$, and $Q_y$, from a stoppage to a restart of the power transfer from the primary side feeder wire 110.

When the power transfer is stopped from a normal power transfer condition at a timing (a) of FIG. 8, a loss of the current i is detected by the current detection unit CT in FIG. 1, and the individual semiconductor switches $Q_u$, $Q_x$, $Q_v$, and $Q_y$ are controlled into "$Q_u$: off, $Q_x$: on, $Q_v$: off, and $Q_y$: on" conditions.

This on/off control corresponds to period I shown in FIG. 2, wherein only the lower arm side semiconductor switches $Q_x$ and $Q_y$ are put into an on condition.

Next, on the power transfer being restarted at a timing (b) of FIG. 8, a voltage in accordance with a high frequency current of the primary side feeder wire 110 is induced in the power receiving coil 120. At this time, the semiconductor switches of the bridge circuit of the power receiving circuit 310 are in the heretofore described on and off conditions, and a resonant current flows along a path from the power receiving coil 120 through the switch $Q_y$ and diode $D_x$ to the resonant capacitor C. The polarity of the current inverts at a timing (c) of FIG. 8, and the current flows along a path from the power receiving coil 120 through the resonant capacitor C and switch $Q_x$ to the diode $D_y$.

A zero-crossing of the current i at a timing (c) is detected by the current detector unit CT, and the control device 200 controls in such a way as to restart the switching action of each semiconductor switch. That is, by maintaining the lower arm side semiconductor switches $Q_x$ and $Q_y$ in the on condition during the period from the timing (a) to the timing (b) for which the power transfer is stopped, it is possible to secure the path of the resonant current flowing through the power receiving coil 120 when the power transfer is restarted, and to restart normally.

In FIG. 8, an example is shown of a condition wherein only the lower arm side semiconductor switches $Q_x$ and $Q_y$ are in the on condition during the period for which the power transfer is stopped, but by putting only the upper arm side semiconductor switches $Q_u$ and $Q_v$ into the on condition too, in the same way as heretofore described, it is possible to secure the path of the resonant current flowing through the power receiving coil 120 when the power transfer is restarted, and it is possible to restart a desired switching action after the zero-crossing of the current i is detected.

Figure 9:
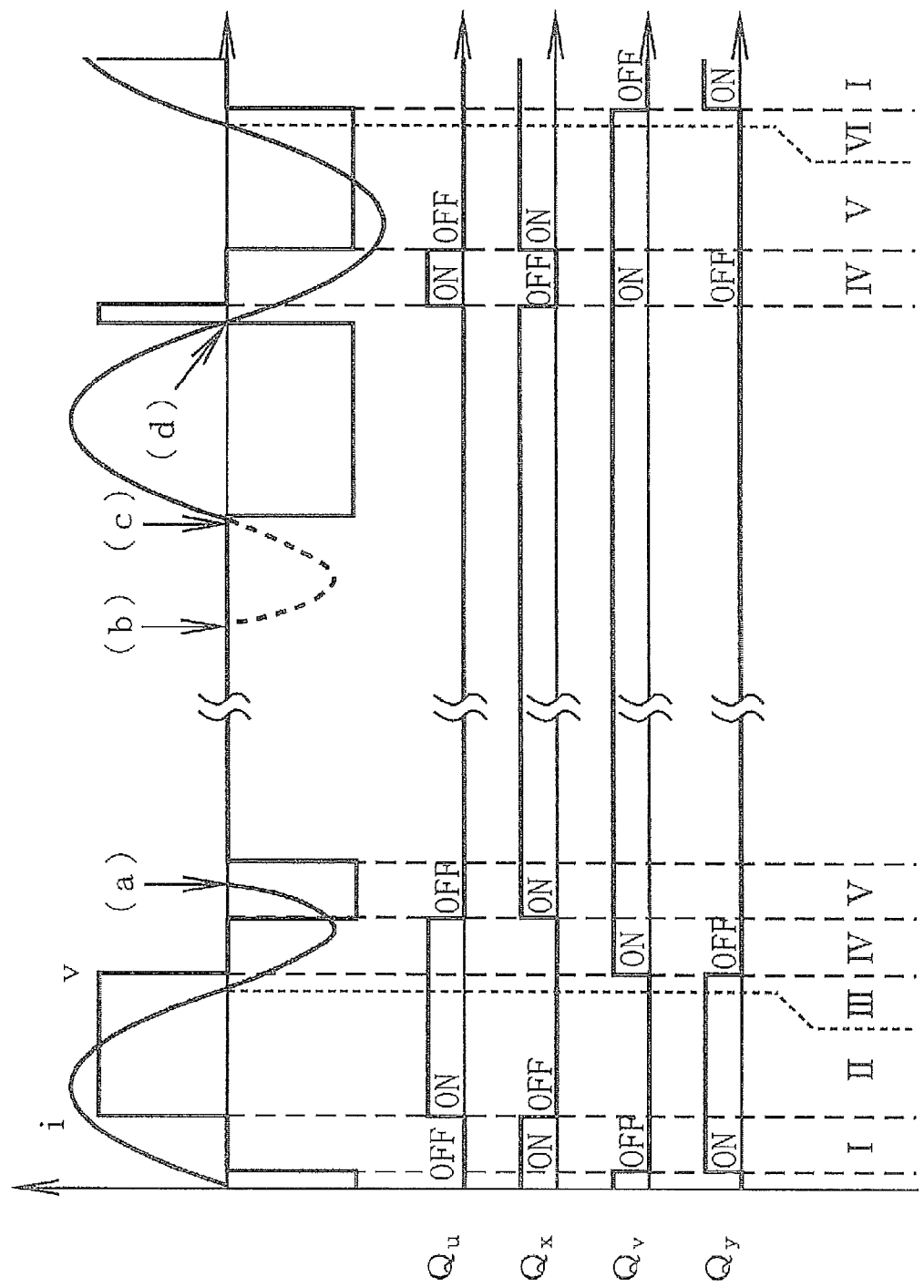
FIG. 9 is an operation illustration showing a third embodiment of the control method according to the invention.

Next, FIG. 9 is an operation illustration showing a third embodiment of the control method according to the invention and, in the same way as FIGS. 7 and 8, shows an operation waveform of the current i and voltage v, and drive signals of the semiconductor switches $Q_u$, $Q_x$, $Q_v$, and $Q_y$, from a stoppage to a restart of the power transfer from the primary side feeder wire 110.

In the embodiment, when the power transfer is stopped from a normal power transfer condition at a timing (a) of FIG. 9, a loss of the current i of the power receiving coil 120 is detected by the current detection unit CT, and the condition of each semiconductor switch $Q_u$, $Q_x$, $Q_v$, and $Q_y$ is maintained at the same control condition as immediately before the current i is lost.

The on/off control of the semiconductor switches $Q_u$, $Q_x$, $Q_v$, and $Q_y$ at this time corresponds to period II or period V in FIG. 2. In FIG. 9, as the current i is negative, a case is shown wherein the semiconductor switches $Q_u$, $Q_x$, $Q_v$, and $Q_y$ are maintained in the same switching conditions as in period V of FIG. 2.

Next, on the power transfer being restarted at a timing (b) of FIG. 9, a voltage in accordance with a high frequency current of the primary side feeder wire 110 is induced in the power receiving coil 120. At this time, the semiconductor switches of the bridge inverter circuit of the power receiving circuit 310 are in the heretofore described on and off conditions, that is, "$Q_u$: off, $Q_x$: on, $Q_v$: on, and $Q_y$: off".

Because of this, a resonant current flows along a path from the power receiving coil 120 through the diode $D_y$, smoothing capacitor $C_0$, and diode $D_x$ to the resonant capacitor C, but when the power receiving coil 120 induced voltage when the power transfer is restarted is smaller than the direct current output voltage $V_o$ it is not possible that the current i flows along this path.

Next, as the current i starts to flow along a path from the resonant capacitor C through the switch $Q_x$, smoothing capacitor $C_0$, and switch $Q_v$ to the power receiving coil 120 on the polarity of the current i inverting at a timing (c) of FIG. 9, a smoothing capacitor $C_0$ discharge period is entered. Furthermore, the polarity of the current i inverts at a timing (d) of FIG. 9, the current i flows along a path from the power receiving coil 120 through the diode $D_y$, smoothing capacitor $C_0$, and diode $D_x$ to the resonant capacitor C, and a smoothing capacitor $C_0$ charge period is entered.

As a zero-crossing of the current i at a timing (d) of FIG. 9 is detected by the current detector unit CT, and the control device 200 controls in such a way as to restart the same kinds of switching action as the normal actions shown in FIG. 2, the semiconductor switches shift to the "$Q_u$: on, $Q_x$: off, $Q_v$: on, and $Q_y$: off" conditions, and the current i flows along the same path as in period IV shown in FIG. 2.

That is, by maintaining the semiconductor switches in the switching conditions immediately before the timing (the timing (a) of FIG. 9) at which the current i of the power receiving coil 120 is lost, the path of the resonant current flowing through the power receiving coil 120 when the power transfer is restarted is secured, and it is possible to restart normally by detecting the zero-crossing of the current i, and restarting the switching actions.

Figure 10:
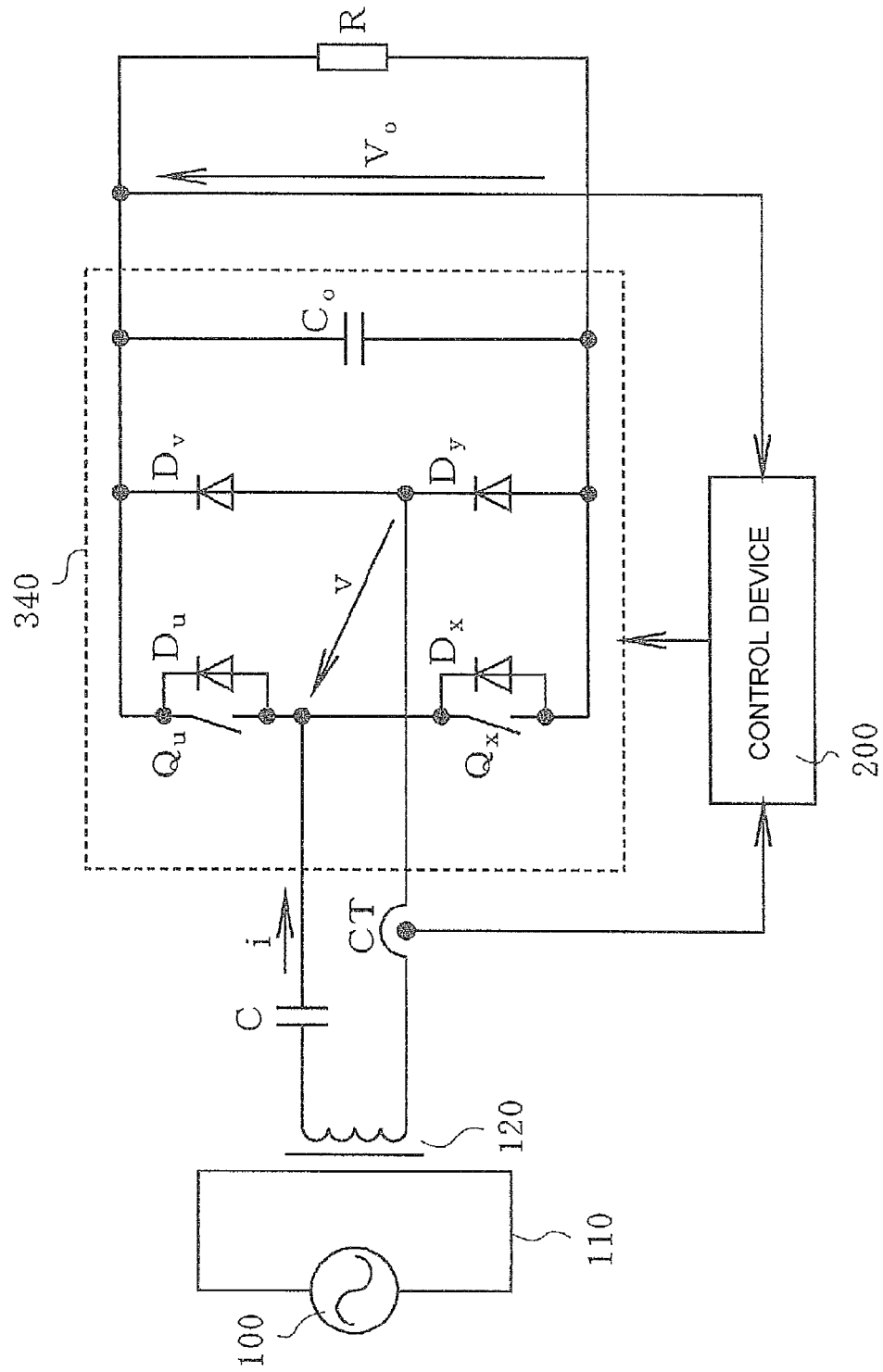
FIG. 10 is a circuit diagram showing a fourth embodiment of the contactless power transfer system according to the invention.

Next, FIG. 10 is a circuit diagram showing a fourth embodiment of the contactless power transfer system according to the invention.

A characteristic of the contactless power transfer systems shown in FIGS. 1, 5, and 6 is that, by configuring the power receiving circuit by bridge connecting the semiconductor switches $Q_u$, $Q_x$, $Q_v$, and $Q_y$, it is possible to control the direct current output voltage $V_o$ to a constant, regardless of whether a motoring load or regenerative load is connected to the subsequent stage. However, as four semiconductor switches are necessary, there is a danger of an increase in size and increase in cost of the device when factoring in a cooling unit, or the like.

Therefore, the contactless power transfer system of the fourth embodiment seeks to achieve a reduction in size and reduction in cost of the device by being compatible only with a motoring load, and not with a regenerative load.

In FIG. 10, a power receiving circuit 340 has a switching arm series circuit wherein an arm in which the diode $D_u$ is connected in reverse parallel to the semiconductor switch $Q_u$ and an arm in which the diode $D_x$ is connected in reverse parallel to the semiconductor switch $Q_x$ are connected in series, and has a diode series circuit wherein the diodes $D_v$ and $D_y$ are connected in series. Then, the switching arm series circuit and diode series circuit are connected in parallel, and the smoothing capacitor $C_o$ is connected to either end of the diode series circuit. An internal connection point of the switching arm series circuit and an internal connection point of the diode series circuit form alternating current terminals of the bridge circuit, and both ends of the diode series circuit form direct current terminals. Other than the power receiving circuit 340, the configuration is the same as in each previously described embodiment.

The control device 200 generates drive signals of the semiconductor switches $Q_u$ and $Q_x$ based on the direct current output voltage Vo of the power receiving circuit 340 and the detection signal of the current i of the power receiving coil 120.

Figure 11:
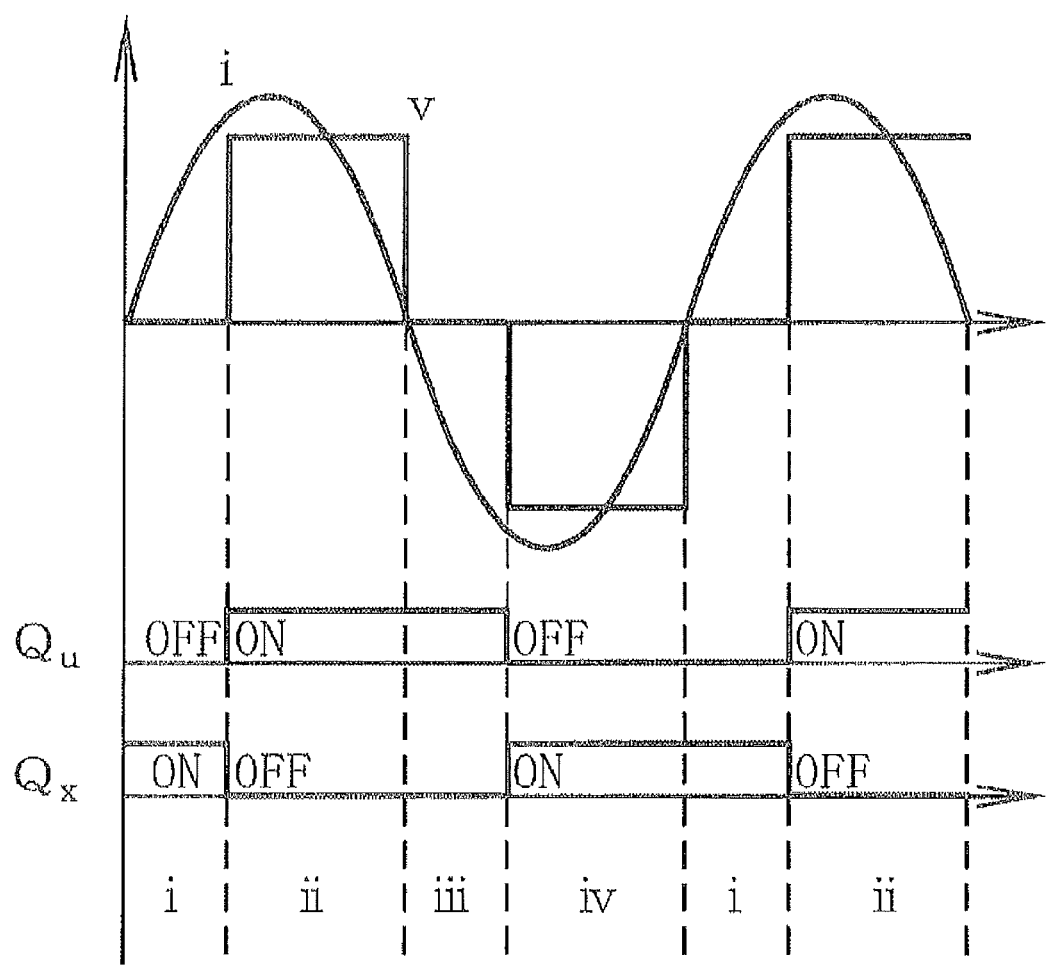
FIG. 11 is an operation illustration of FIG. 10.

FIG. 11 is an operation illustration of the circuit of FIG. 10, and shows an operation waveform of the current i and voltage v, and drive signals of the semiconductor switches $Q_u$ and $Q_x$.

As shown in FIG. 11, the semiconductor switches $Q_u$ and $Q_x$ carry out a switching action at a constant frequency in synchronization with the current i of the power receiving coil 120. Hereafter, a description will be given of an action in each period i to iv of FIG. 11.

1. Period i (switch $Q_x$ on, diode $D_y$ has continuity): the current i flows along a path from the resonant capacitor C through the switch $Q_x$ and diode $D_y$ to the power receiving coil 120, and the voltage v is at a zero voltage level, as shown in the drawing.

2. Period ii (switch $Q_u$ on, diode $D_y$ has continuity): the current i flows along a path from the resonant capacitor C through the diode $D_u$, smoothing capacitor $C_0$, and diode $D_y$ to the power receiving coil 120, and the voltage v is at a positive voltage level corresponding to the direct current output voltage $V_o$, as shown in the drawing. In this period, the smoothing capacitor $C_0$ is charged by the current i.

3. Period iii (switch $Q_u$ on, diode $D_v$ has continuity): the current i flows along a path from the resonant capacitor C through the power receiving coil 120 and diode $D_v$ to the switch $Q_u$, and the voltage v is at a zero voltage level, as shown in the drawing.

4. Period iv (switch $Q_x$ on, diode $D_v$ has continuity): the current i flows along a path from the resonant capacitor C through the power receiving coil 120, diode $D_v$, and smoothing capacitor $C_0$ to the diode $D_x$, and the voltage v is at a negative voltage level corresponding to the direct current output voltage $V_o$, as shown in the drawing. In this period, the smoothing capacitor $C_0$ is charged by the current i.

Subsequently, there is a transition to the switching mode of period i, and the same actions are repeated.

By controlling the semiconductor switches $Q_u$ and $Q_x$ as heretofore described, the alternating current voltage v of the bridge circuit is controlled by positive and negative voltages with the direct current output voltage $V_o$ as a crest value. Power fed from the primary side feeder wire 110 to the power receiving circuit 340 is the product of the current i and voltage v shown in FIG. 11, and control of the power fed, that is, a constant control of the direct current output voltage $V_o$, is enabled by the control device 200 adjusting the phases of the drive signals of the semiconductor switches $Q_u$ and $Q_x$ based on the detected value of the direct current output voltage $V_o$.

Figure 12:
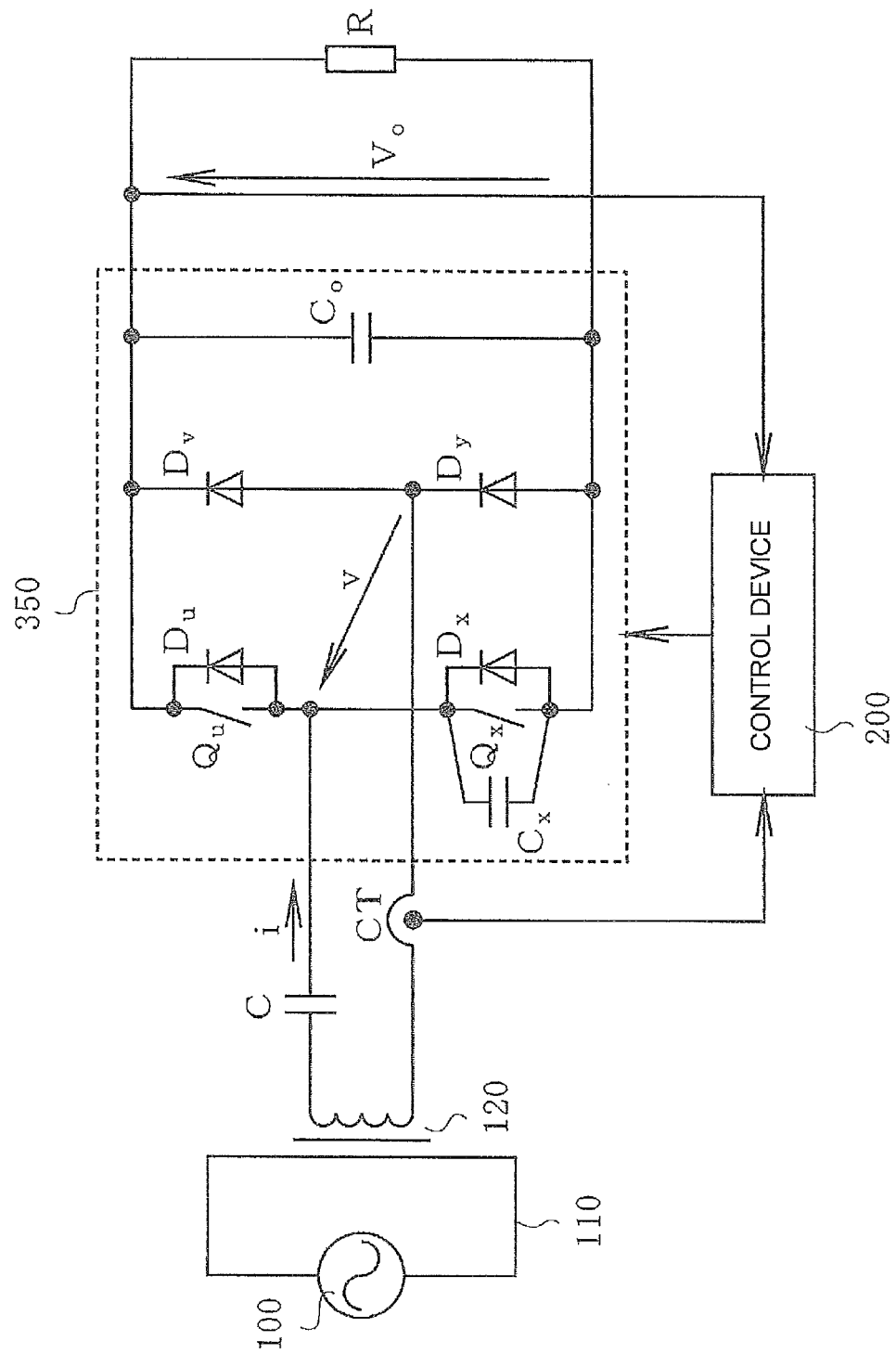
FIG. 12 is a circuit diagram showing a fifth embodiment of the contactless power transfer system according to the invention.

FIG. 12 is a circuit diagram showing a fifth embodiment of the contactless power transfer system according to the invention. In this embodiment, the capacitor $C_x$ is connected to the lower arm side semiconductor switch $Q_x$, with the same idea as in the first embodiment of FIG. 1. According to the fifth embodiment, it is possible to carry out a so-called soft switching at a time of on/off actions of the semiconductor switches when there is a switching between the periods shown in FIG. 11.

Figure 13:
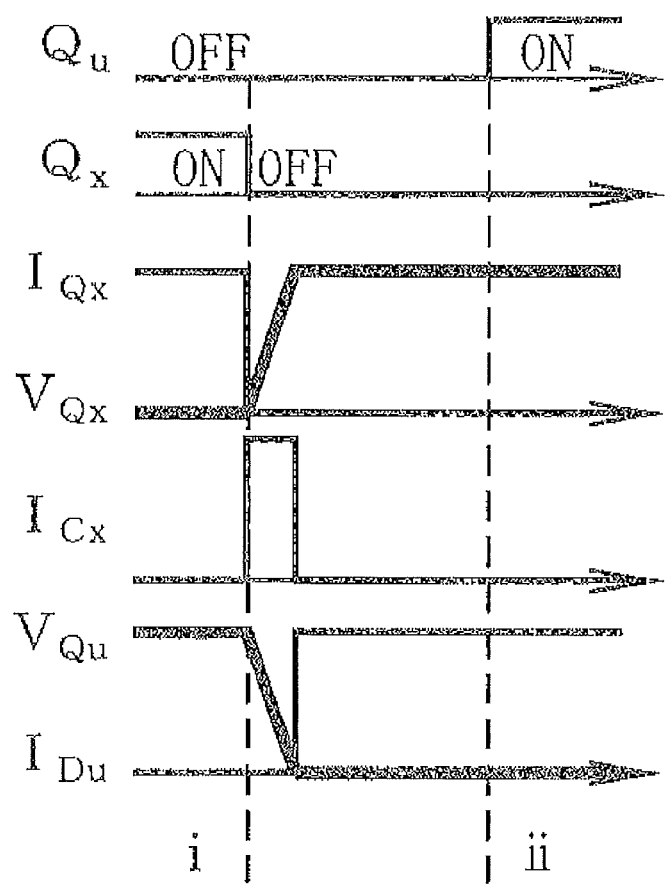
FIG. 13 is an operation illustration of a soft switching in a predetermined period of FIG. 11.

FIG. 13 is an operation waveform drawing of the semiconductor switches $Q_u$ and $Q_x$ in period i to period ii shown in FIG. 11. As the operation waveform drawing is the same as the operation waveform drawing of the semiconductor switches $Q_u$ and $Q_x$ in period I to period II shown in FIG. 4, a description will be omitted here.

It is possible to carry out a zero voltage switching owing to the charging and discharging actions of the capacitor $C_x$ connected in parallel to the switch $Q_x$ for the on/off actions of the semiconductor switches not only when switching from period i to period ii, but also when switching between other periods.

Figure 14:
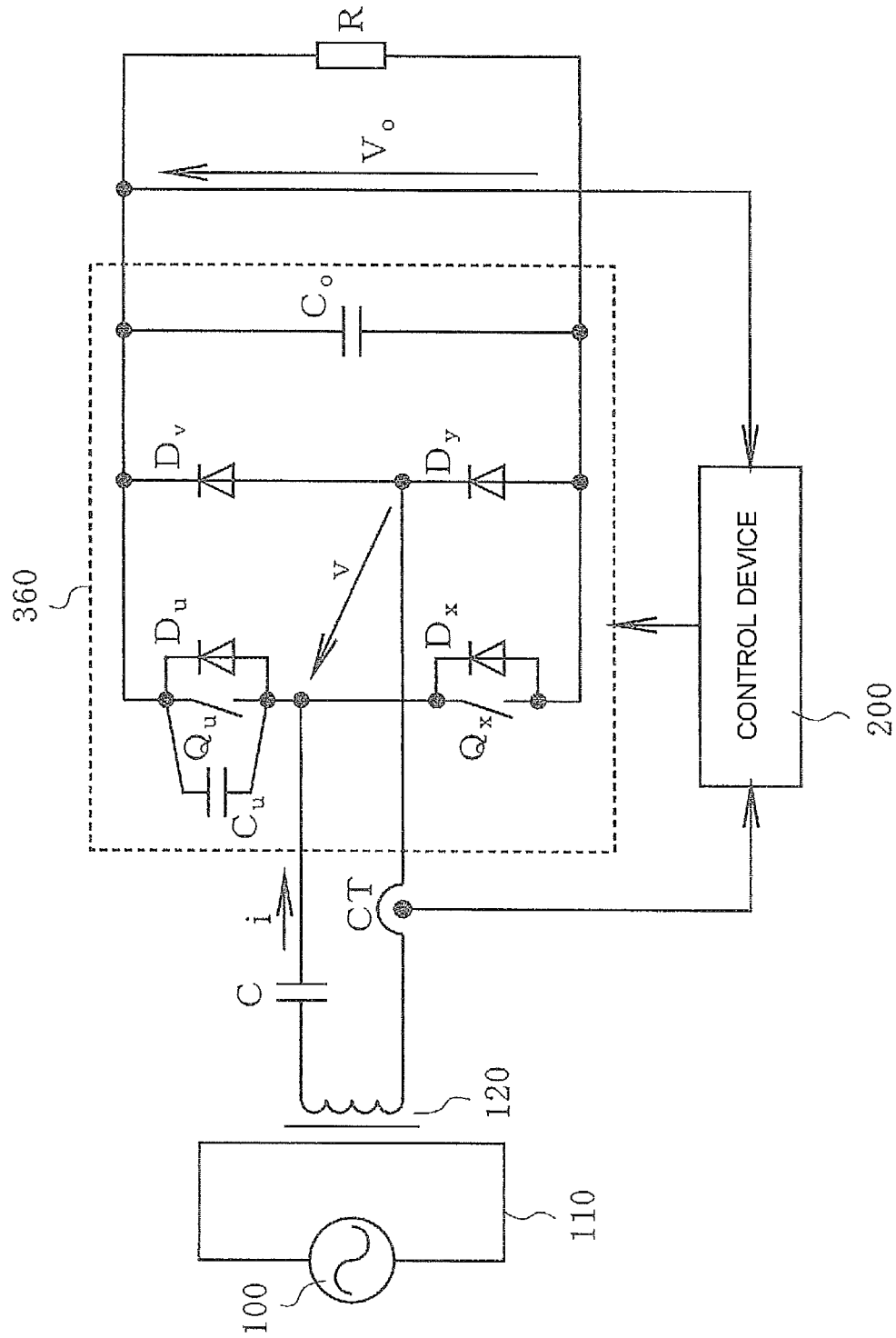
FIG. 14 is a circuit diagram showing a sixth embodiment of the contactless power transfer system according to the invention.
Figure 15:
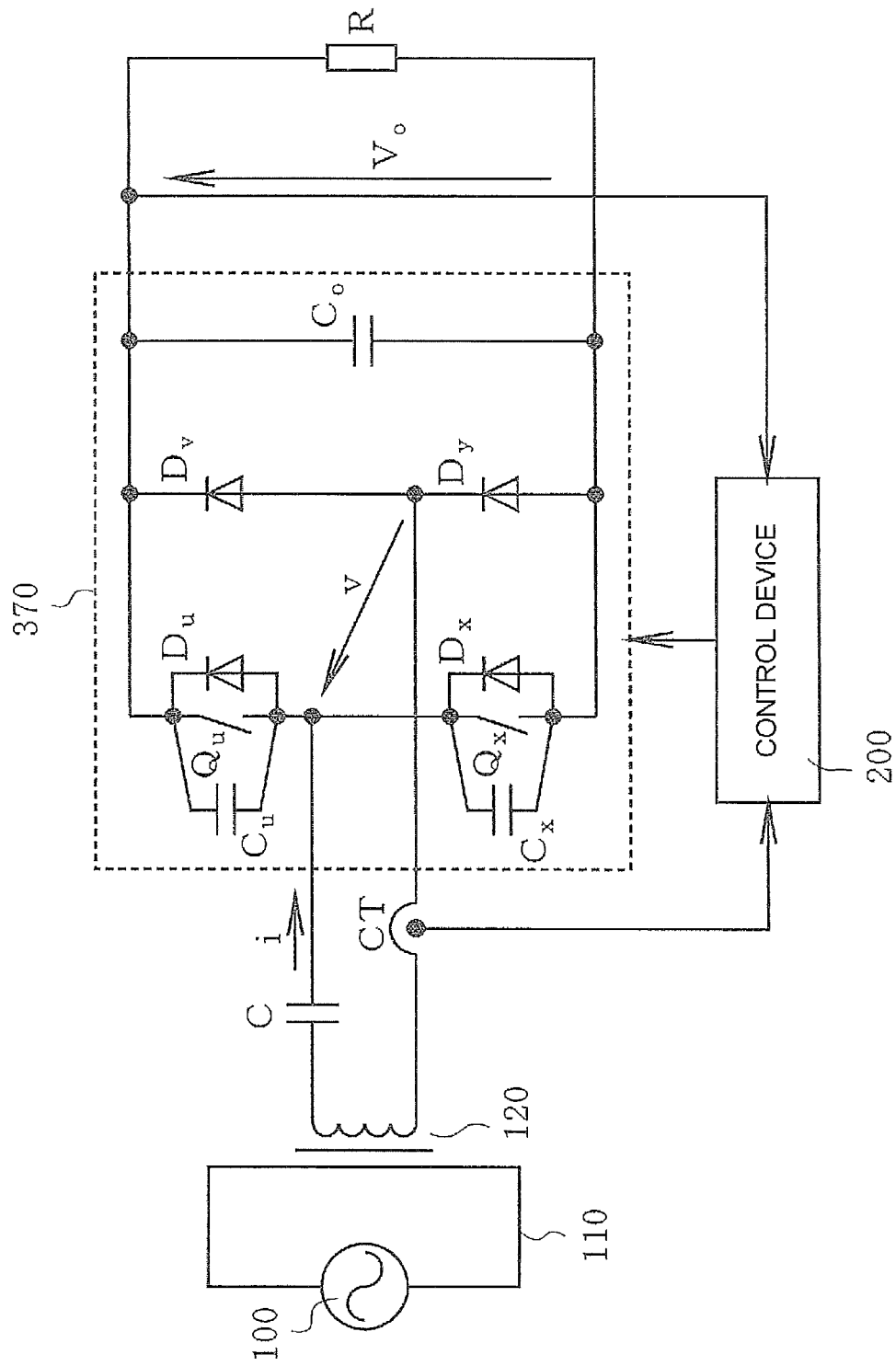
FIG. 15 is a circuit diagram showing a seventh embodiment of the contactless power transfer system according to the invention.

Also, as examples of capacitors being connected in parallel to semiconductor switches, a capacitor may be connected to the upper arm side switch $Q_u$, as shown in a sixth embodiment of FIG. 14, or capacitors may be connected to the upper and lower arm semiconductor switches $Q_u$ and $Q_x$, as shown in a seventh embodiment of FIG. 15. In these cases too, a zero voltage switching is possible.

Figure 16:
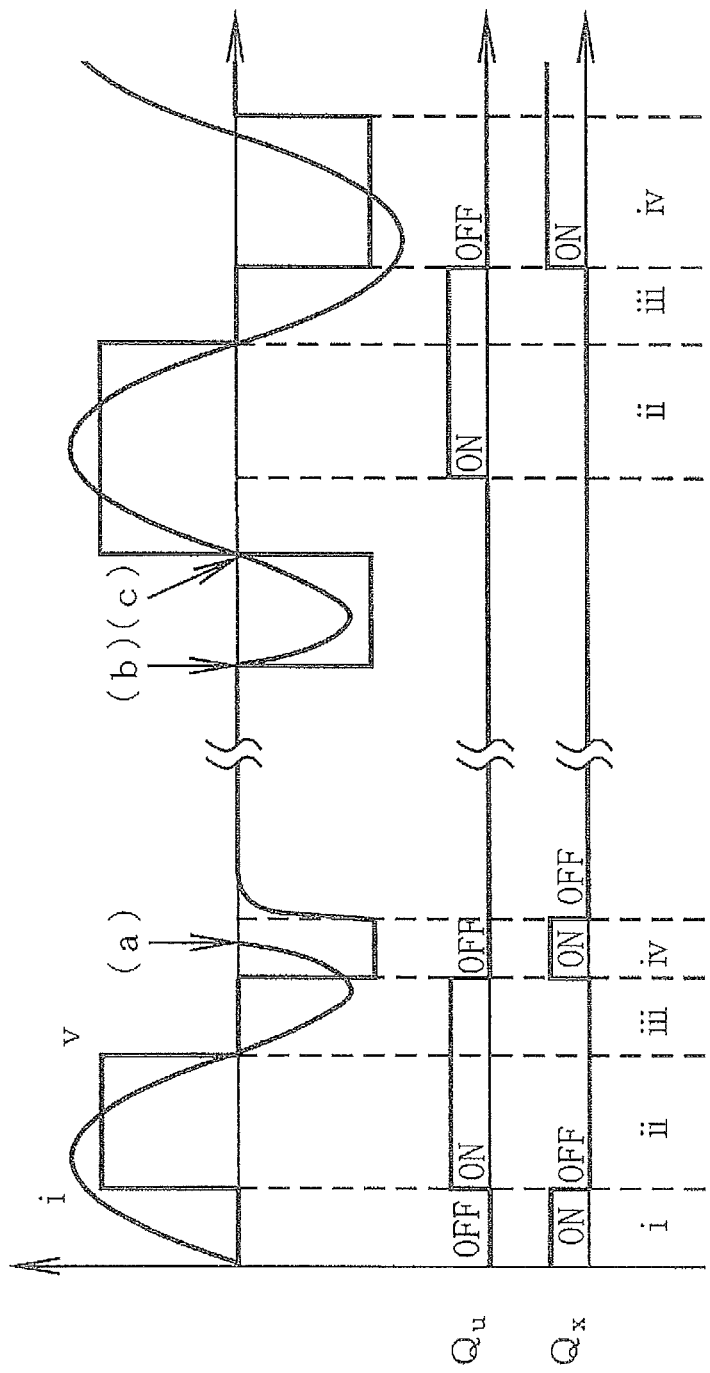
FIG. 16 is an operation illustration showing a fourth embodiment of the control method according to the invention.

Next, FIG. 16 is an operation illustration showing a fourth embodiment of the control method according to the invention, and shows an operation waveform of the current i and voltage v, and drive signals of the semiconductor switches $Q_u$ and $Q_x$, from a stoppage to a restart of the power transfer from the primary side feeder wire 110.

When the power transfer from the power receiving coil 120 is stopped from a normal power transfer condition at a timing (a) of FIG. 16, a loss of the current i is detected by the current detection unit CT in FIG. 10, both switches $Q_u$ and $Q_x$ are put into an off condition, and that condition is maintained.

Subsequently, on the power transfer being restarted at a timing (b) of FIG. 16, a voltage in accordance with a high frequency current of the primary side feeder wire 110 is induced in the power receiving coil 120. At this time, as the switches $Q_u$ and $Q_x$ are in an off condition as heretofore described, the bridge circuit of the power receiving circuit 340 is equivalent to a diode full-wave rectifier circuit. Because of this, a resonant current flows along a path from the power receiving coil 120 through the diode $D_v$, smoothing capacitor $C_o$, and diode $D_x$ to the resonant capacitor C. The polarity of the current inverts at a timing (c) of FIG. 16, and the current flows along a path from the power receiving coil 120 through the resonant capacitor C, diode $D_u$, and smoothing capacitor $C_o$ to the diode $D_y$.

A zero-crossing of the current i at the timing (c) is detected by the current detector unit CT, and the control device 200 controls in such a way as to restart the switching action of each semiconductor switch $Q_u$ and $Q_x$. Because of this, the path of the resonant current flowing through the power receiving coil 120 when the power transfer is restarted is secured by temporarily carrying out a full-wave rectifying action with the diodes, and it is possible to restart normally by starting a desired switching action after the zero-crossing of the current i is detected.

The heretofore described circuit action is established under a condition whereby the power receiving coil induced voltage when the power transfer is restarted is greater than the direct current output voltage $V_o$ (the smoothing capacitor $C_0$ voltage). Because of this, when the power receiving coil induced voltage when the power transfer is restarted is smaller than the direct current output voltage $V_o$ because of the characteristics of the connected load, it is possible to carry out a restarting action using a control method according to the following fifth embodiment.

Figure 17:
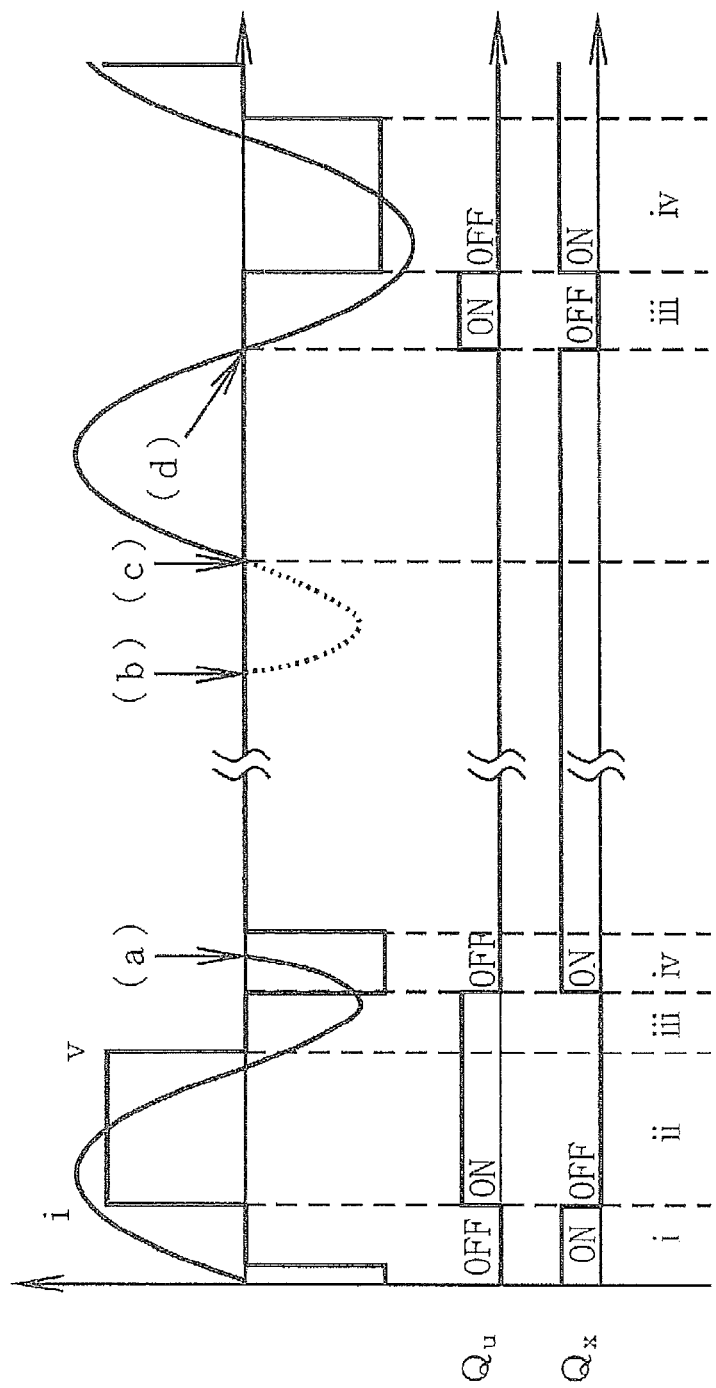
FIG. 17 is an operation illustration showing a fifth embodiment of the control method according to the invention.

FIG. 17 is an operation illustration showing a fifth embodiment of the control method according to the invention, and shows an operation waveform of the current i and voltage v, and drive signals of the semiconductor switches $Q_u$ and $Q_x$, from a stoppage to a restart of the power transfer from the primary side feeder wire 110.

When the power transfer from the power receiving coil 120 is stopped from a normal power transfer condition at a timing (a) of FIG. 17, in the embodiment, a loss of the current is detected by the current detection unit CT, and the condition of each switch $Q_u$ and $Q_x$ is maintained at the same control condition as immediately before the current i is lost.

The on/off control at this time corresponds to period ii or period iv shown in FIG. 11. In FIG. 17, as the current i is negative, a case is shown wherein the semiconductor switches $Q_u$ and $Q_x$ are maintained in the same switching conditions as in period iv of FIG. 11.

Next, on the power transfer being restarted at a timing (b) of FIG. 17, a voltage in accordance with a high frequency current of the primary side feeder wire 110 is induced in the power receiving coil 120. At this time, the bridge circuit of the power receiving circuit 340 is in the heretofore described on and off condition (switch $Q_u$ is off, switch $Q_x$ is on), and a resonant current flows along a path from the power receiving coil 120 through the diode $D_y$, smoothing capacitor $C_0$, and diode $D_x$ to the resonant capacitor C, but when the power receiving coil induced voltage when the power transfer is restarted is smaller than the direct current output voltage $V_o$ it is not possible that the current flows along this path.

Next, as the current i starts to flow along a path from the resonant capacitor C through the switch $Q_x$ and diode $D_y$ to the power receiving coil 120 on the polarity of the current inverting at a timing (c) of FIG. 17, the voltage v is at a zero voltage level, as shown in the drawing. Furthermore, on the polarity of the current i inverting at a timing (d) of FIG. 17, a zero-crossing of the current i is detected in the control device 200 from the output of the current detector unit CT.

Then, as the control device 200 controls in such a way as to restart the same kinds of switching action as the normal actions shown in FIG. 11, the switch $Q_u$ switches to an on condition, and the switch $Q_x$ to an off condition, and the current flows along the same path as in period iii shown in FIG. 11.

That is, even when putting the switches $Q_u$ and $Q_x$ into the same control conditions as immediately before the current i is lost, the path of the resonant current flowing through the power receiving coil 120 when the power transfer is restarted is secured, and it is possible to restart normally by detecting the zero-crossing of the current i, and restarting the switching actions.

Figure 18:
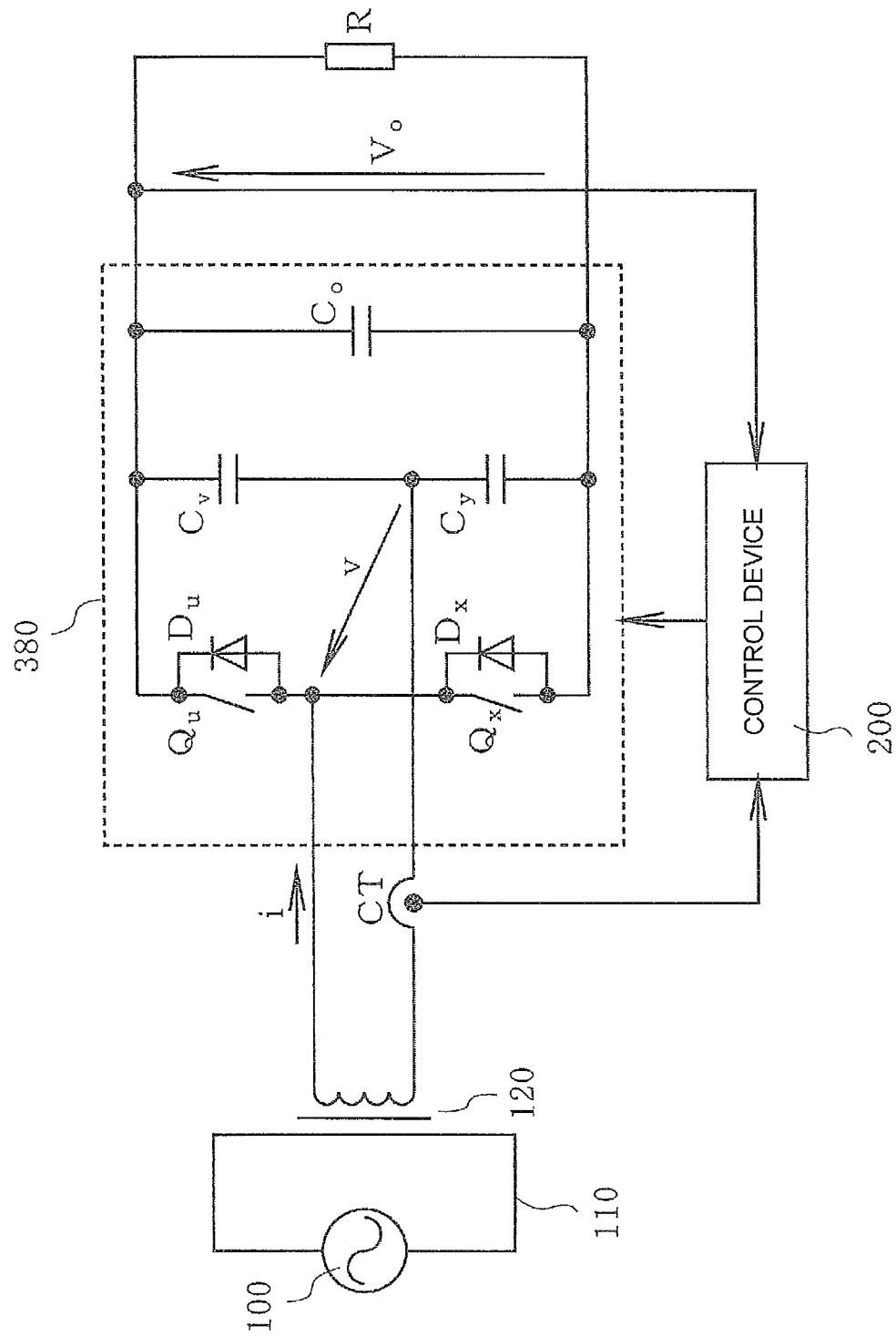
FIG. 18 is a circuit diagram showing an eighth embodiment of the contactless power transfer system according to the invention.

Next, FIG. 18 is a circuit diagram showing an eighth embodiment of the contactless power transfer system according to the invention. With the contactless power transfer systems shown in FIGS. 10, 12, 14, and 15, the number of semiconductor switches is reduced, and a reduction in size and cost of the device is sought, by configuring the bridge circuit with a switching arm series circuit and diode series circuit. However, these contactless power transfer systems are compatible only when a load connected at a subsequent stage is a motoring load, and are not compatible when the load is a regenerative load.

Therefore, the contactless power transfer system of the eighth embodiment has a configuration compatible with both a motoring load and a regenerative load, while seeking a reduction in size and reduction in cost of the device.

In FIG. 18, a power receiving circuit 380 has a switching arm series circuit wherein an arm in which the diode $D_u$ is connected in reverse parallel to the semiconductor switch $Q_u$ and an arm in which the diode $D_x$ is connected in reverse parallel to the semiconductor switch $Q_x$ are connected in series, and has a capacitor series circuit wherein resonant capacitors $C_v$ and $C_y$ are connected in series. As the resonant capacitors $C_v$ and $C_y$ are connected in the same positions as the capacitors $C_v$ and $C_y$ in FIG. 6 and the like, the same reference numerals and characters are used.

Then, the switching arm series circuit and capacitor series circuit are connected in parallel, and the smoothing capacitor $C_o$ is connected to either end of the capacitor series circuit. An internal connection point of the switching arm series circuit and an internal connection point of the capacitor series circuit form alternating current terminals of the bridge circuit, and both ends of the capacitor series circuit form direct current terminals. The power receiving coil 120 is connected to the alternating current terminals of the bridge circuit, and the load R is connected to the direct current terminals.

The control device 200 generates drive signals of the semiconductor switches $Q_u$ and $Q_x$ based on the direct current output voltage $V_o$ of the power receiving circuit 380 and the detection signal of the current i of the power receiving coil 120.

Next, a description will be given of actions when the contactless power transfer system shown in FIG. 18 is normal.

The circuit shown in FIG. 18 is such that a bidirectional power supply is possible between the power receiving coil 120 and the load R. Hereafter, a description will be given of two kinds of circuit action, a case of supplying power from the power receiving coil 120 to the load R and a case of supplying power from the load R to the power receiving coil 120.

Firstly, a description will be given of the actions in the case of supplying power from the power receiving coil 120 to the load R.

Figure 19:
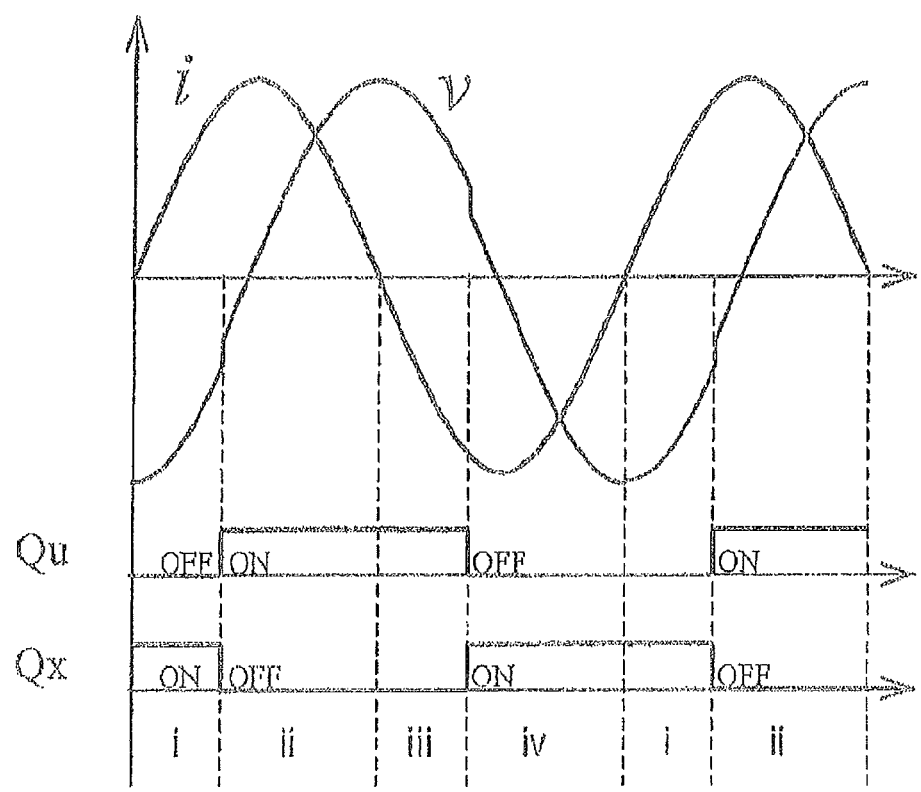
FIG. 19 is an operation illustration of FIG. 18.

FIG. 19 shows an operation waveform of the current i flowing through the power receiving coil 120 of FIG. 18 and of the alternating current voltage v of the bridge circuit, and drive signals of the semiconductor switches $Q_u$ and $Q_x$. As shown in FIG. 19, the semiconductor switches $Q_u$ and $Q_x$ carry out a switching action at a constant frequency in synchronization with the current i of the power receiving coil 120. Hereafter, a description will be given of an action in each period i to iv of FIG. 19.

1. Period i (switch $Q_x$ on): the current i flows along a path from the power receiving coil 120 through the switch $Q_x$ to the capacitor $C_y$, and the capacitor $C_y$ is discharged. At this time, the voltage v is at a negative voltage level corresponding to the voltage of the capacitor $C_y$.

2. Period ii (switch $Q_u$ on): the current i flows along a path from the power receiving coil 120 through the diode $D_u$ and smoothing capacitor $C_0$ to the capacitor $C_y$, the smoothing capacitor $C_0$ is charged, and the capacitor $C_y$ is discharged. At this time, the voltage v is at a voltage level corresponding to the difference between the direct current output voltage $V_o$ and the voltage of the capacitor $C_y$.

3. Period iii (switch $Q_u$ on): the current i flows along a path from the power receiving coil 120 through the capacitor $C_v$ to the switch $Q_u$, and the capacitor $C_v$ is discharged. At this time, the voltage v is at a positive voltage level corresponding to the voltage of the capacitor $C_v$.

4. Period iv (switch $Q_x$ on): the current i flows along a path from the power receiving coil 120 through the capacitor $C_v$ and smoothing capacitor $C_0$ to the diode $D_x$, the smoothing capacitor $C_0$ is charged, and the capacitor $C_v$ is discharged. At this time, the voltage v is at a voltage level corresponding to the difference between the voltage of the capacitor $C_v$ and the direct current output voltage $V_o$.

Subsequently, there is a transition to the switching mode of period i, and the same actions are repeated.

Next, a description will be given of the case of supplying power from the load R to the power receiving coil 120.

Figure 20:
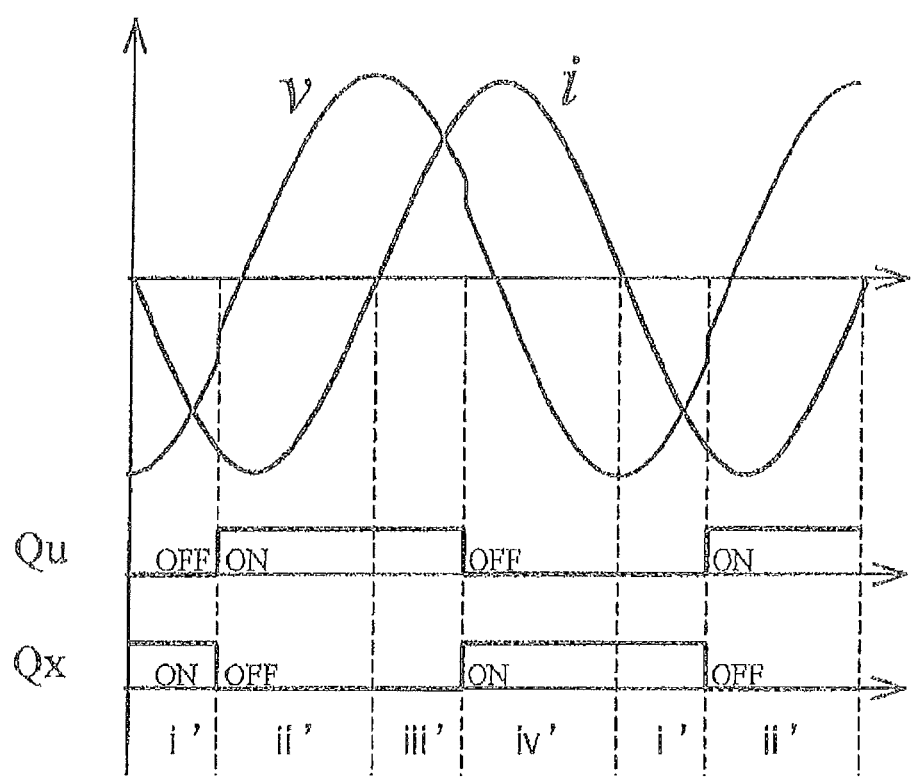
FIG. 20 is another operation illustration of FIG. 18.

FIG. 20, in the same way as FIG. 19, shows an operation waveform of the current i flowing through the power receiving coil 120 and of the alternating current voltage v of the bridge circuit, and drive signals of the semiconductor switches $Q_u$ and $Q_x$.

As shown in FIG. 20, the semiconductor switches $Q_u$ and $Q_x$ carry out a switching action at a constant frequency in synchronization with the current i of the power receiving coil 120. Hereafter, a description will be given of an action in each period i' to iv' of FIG. 20.

1. Period i' (switch $Q_x$ on): the current i flows along a path from the power receiving coil 120 through the capacitor $C_y$ to the diode $D_x$, and the capacitor $C_y$ is charged. At this time, the voltage v is at a negative voltage level corresponding to the voltage of the capacitor $C_y$.

2. Period ii' (switch $Q_u$ on): the current i flows along a path from the power receiving coil 120 through the capacitor $C_y$ and smoothing capacitor $C_0$ to the switch $Q_u$, the smoothing capacitor $C_0$ is discharged, and the capacitor $C_y$ is charged. At this time, the voltage v is at a voltage level corresponding to the difference between the direct current output voltage $V_o$ and the voltage of the capacitor $C_y$.

3. Period iii' (switch $Q_u$ on): the current i flows along a path from the power receiving coil 120 through the diode $D_u$ to the capacitor $C_y$, and the capacitor $C_y$ is charged. At this time, the voltage v is at a positive voltage level corresponding to the voltage of the capacitor $C_v$.

4. Period iv' (switch $Q_x$ on): the current i flows along a path from the power receiving coil 120 through the switch $Q_x$, smoothing capacitor $C_0$, and capacitor $C_y$ to the power receiving coil 120, the smoothing capacitor $C_0$ is discharged, and the capacitor $C_v$ is charged. At this time, the voltage v is at a voltage level corresponding to the difference between the voltage of the capacitor $C_v$ and the direct current output voltage $V_o$.

Subsequently, there is a transition to the switching mode of period i', and the same actions are repeated.

By controlling the semiconductor switches $Q_u$ and $Q_x$ as heretofore described, the alternating current voltage v of the bridge circuit is controlled to the voltage of the capacitors $C_y$ and $C_v$, or to the difference between the direct current output voltage Vo and the voltage of the capacitors $C_y$ and $C_v$. Power fed from the primary side feeder wire 110 to the power receiving circuit 380 is the product of the current i and voltage v shown in FIG. 19, and control of the power fed, that is, a constant control of the direct current output voltage $V_o$, is enabled by the control device 200 adjusting the phases of the drive signals of the semiconductor switches $Q_u$ and $Q_x$ based on the detected value of the direct current output voltage $V_o$.

Figure 21:
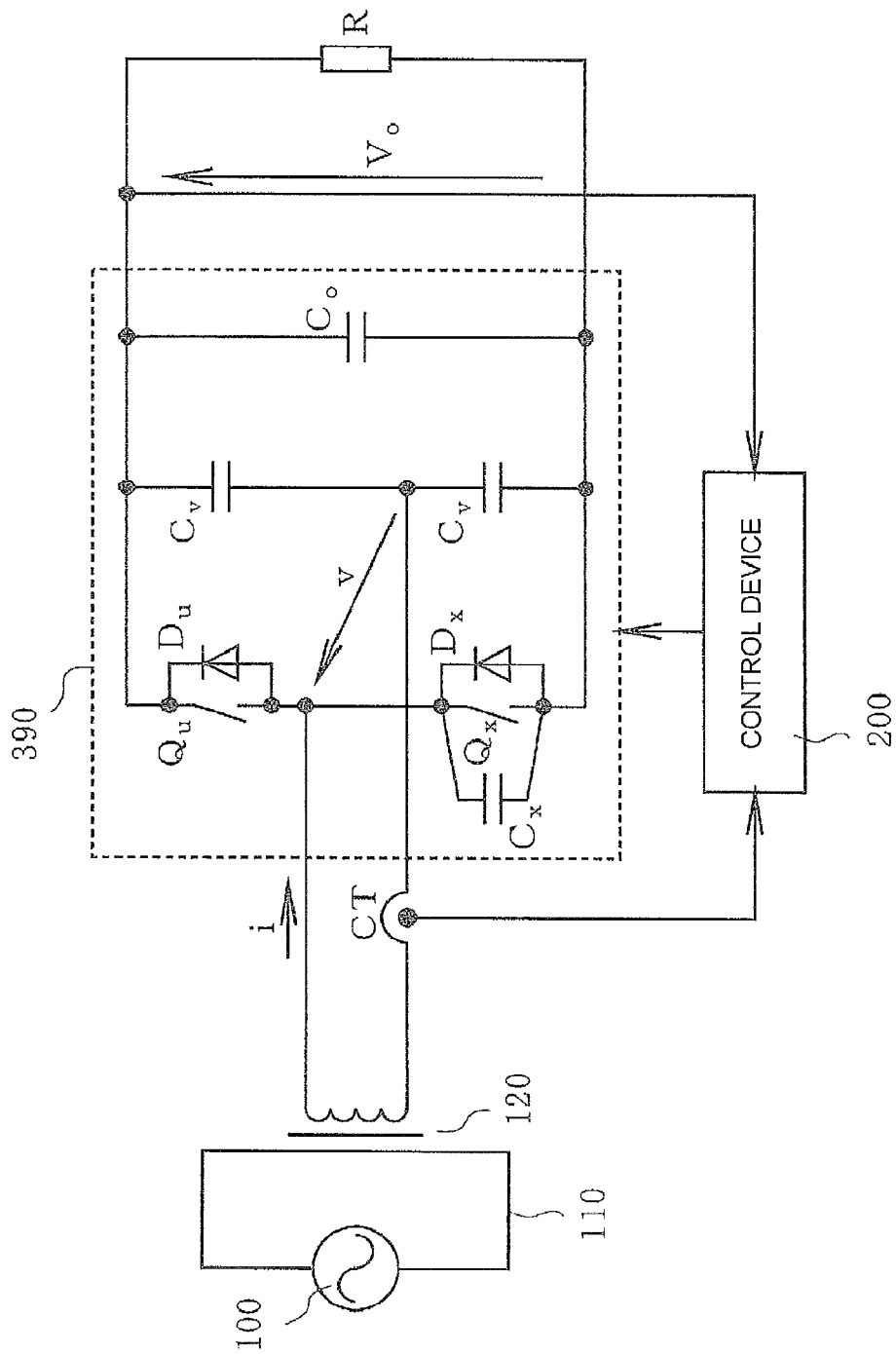
FIG. 21 is a circuit diagram showing a ninth embodiment of the contactless power transfer system according to the invention.

FIG. 21 is a circuit diagram showing a ninth embodiment of the contactless power transfer system according to the invention, wherein reference numeral 390 is a power receiving circuit. In this embodiment, the capacitor $C_x$ is connected to the lower arm side semiconductor switch $Q_x$, with the same idea as in the first embodiment of FIG. 1. According to the ninth embodiment, it is possible to carry out a so-called soft switching at a time of on/off actions of the semiconductor switches when there is a switching between the periods shown in FIGS. 19 and 20.

Figure 22:
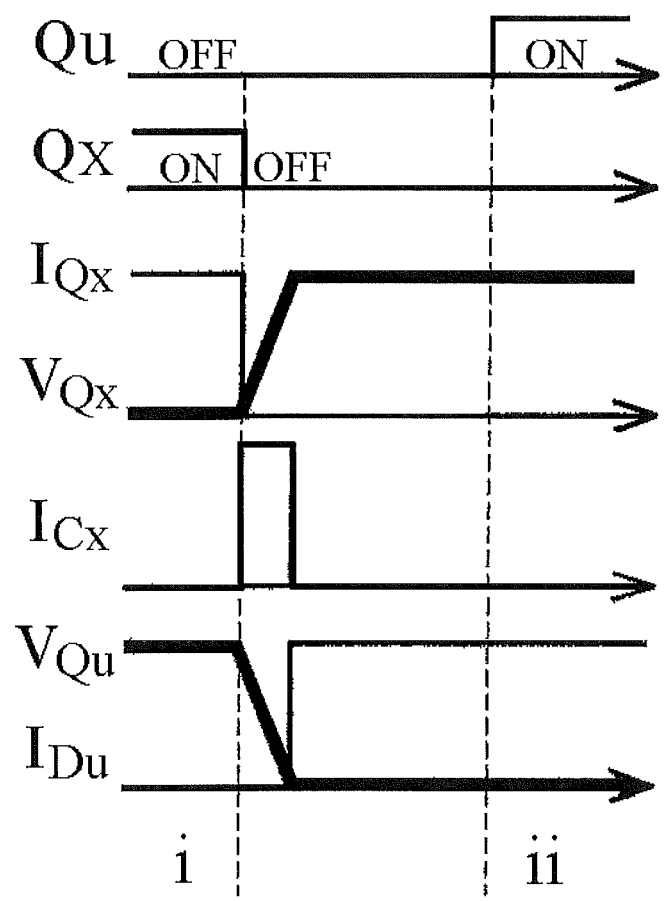
FIG. 22 is an operation illustration of a soft switching in a predetermined period of FIG. 19.

FIG. 22 is an operation waveform drawing of the semiconductor switches $Q_u$ and $Q_x$ in period i to period ii shown in FIG. 19. As the operation waveform drawing is the same as the operation waveform drawing of the semiconductor switches $Q_u$ and $Q_x$ in period I to period II of FIG. 4, a description will be omitted here.

It is possible to carry out a zero voltage switching owing to the charging and discharging actions of the capacitor $C_x$ connected in parallel to the switch $Q_x$ for the on/off actions of the semiconductor switches not only when switching from period i to period ii, but also when switching between other periods.

Figure 23:
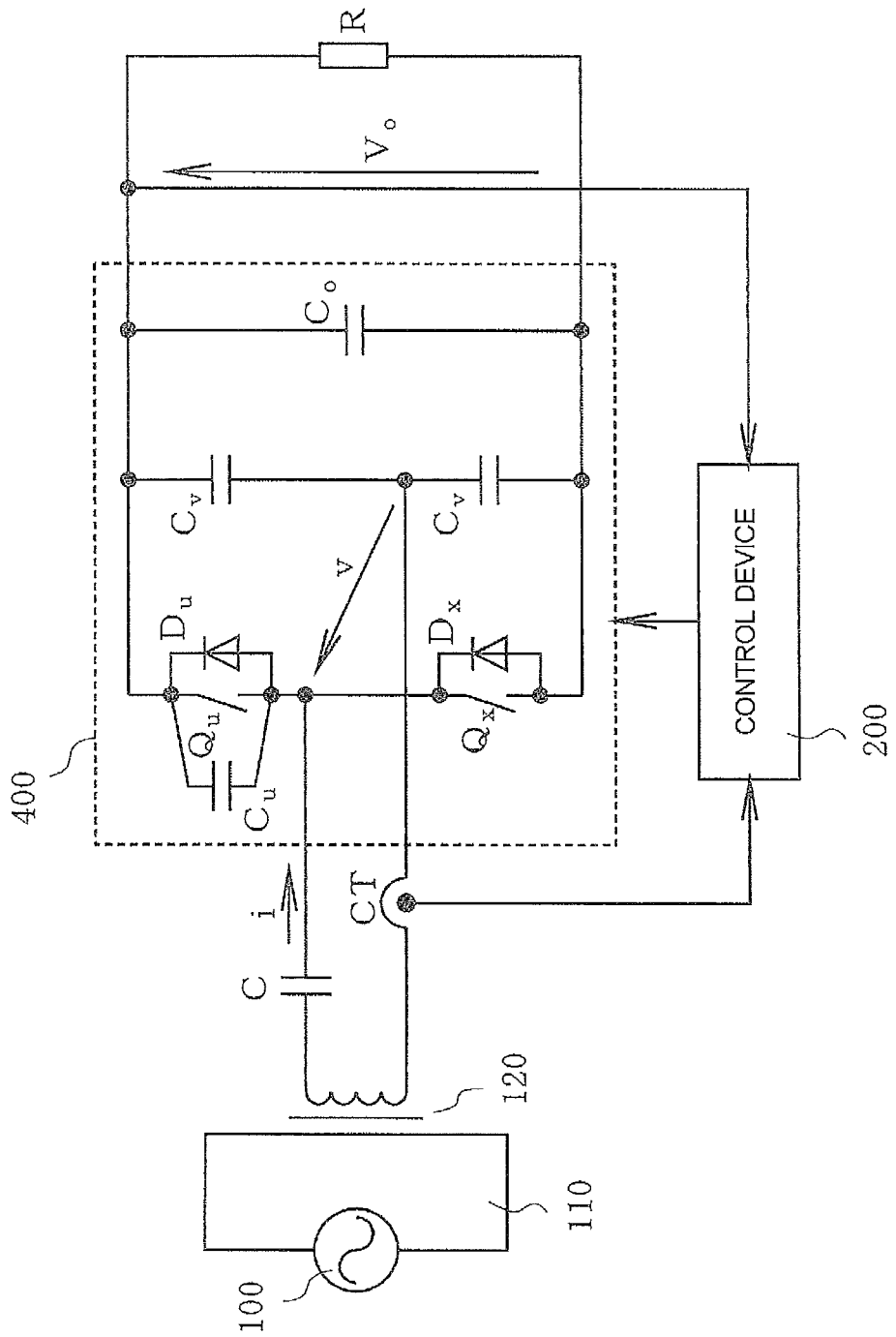
FIG. 23 is a circuit diagram showing a tenth embodiment of the contactless power transfer system according to the invention.
Figure 24:
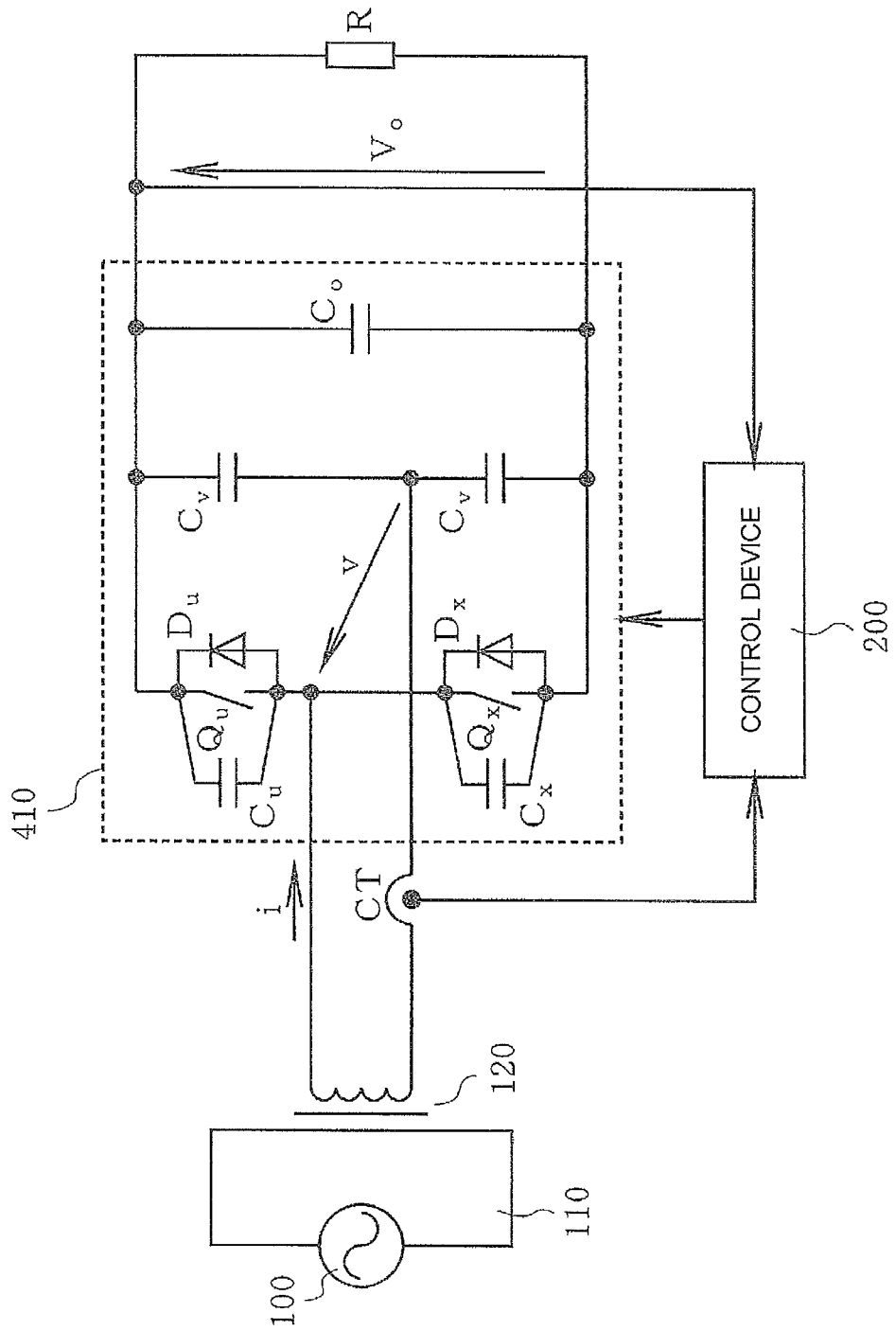
FIG. 24 is a circuit diagram showing an eleventh embodiment of the contactless power transfer system according to the invention.

Also, as examples of capacitors being connected in parallel to semiconductor switches, the capacitor $C_u$ may be connected in parallel to the upper arm side switch $Q_u$, as in a contactless power transfer system 400 according to a tenth embodiment of FIG. 23, or the capacitors $C_u$ and $C_x$ may be connected in parallel to the upper and lower arm semiconductor switches $Q_u$ and $Q_x$ respectively, as in a contactless power transfer system 410 according to an eleventh embodiment of FIG. 24. In these cases too, a zero voltage switching is possible.

Figure 25:
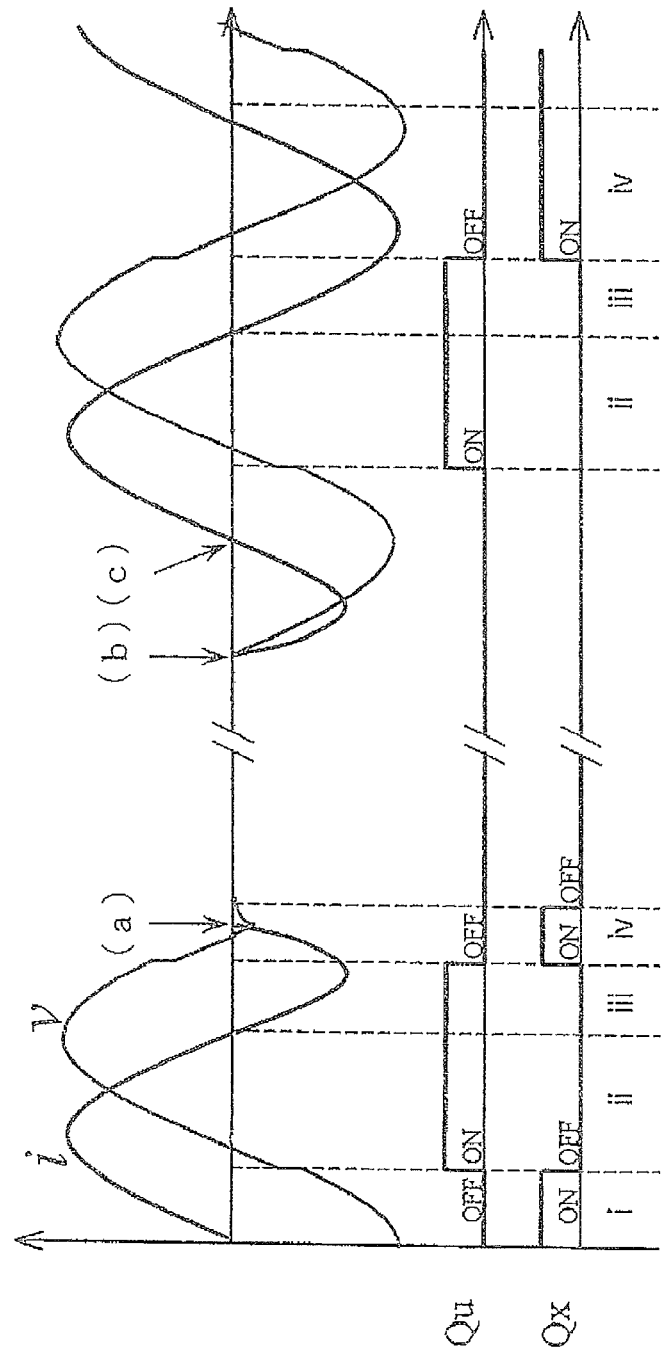
FIG. 25 is an operation illustration showing the fourth embodiment of the control method according to the invention.

Next, FIG. 25, in the same way as FIG. 16, is an operation illustration showing the fourth embodiment of the control method according to the invention, and shows an operation waveform of the current i and voltage v, and drive signals of the semiconductor switches $Q_u$ and $Q_x$, from a stoppage to a restart of the power transfer from the primary side feeder wire 110. This control method is applied to the eighth to eleventh embodiments of the contactless power transfer system shown in FIGS. 18, 21, 23, and 24, and a basic restarting method is essentially the same as the method illustrated in the operation illustration of FIG. 16.

That is, a stoppage of the power transfer from the power receiving coil 120 and a loss of the current i are detected at a timing (a) of FIG. 25, the switches $Q_u$ and $Q_x$ are put into an off condition, and that condition is maintained. Then, on the power transfer being restarted at a timing (b), a voltage in accordance with a high frequency current of the primary side feeder wire 110 is induced in the power receiving coil 120, and a resonant current flows along a path from the power receiving coil 120 through the resonant capacitor $C_v$ and smoothing capacitor $C_o$ to the diode D. The polarity of the current inverts at a timing (c), and the current flows along a path from the power receiving coil 120 through the diode $D_u$ and smoothing capacitor $C_o$ to the resonant capacitor $C_y$.

In the control device 200, a restart is enabled by a zero-crossing of the current i at the timing (c) being detected by the current detector unit CT, and the switching action of each semiconductor switch $Q_u$ and $Q_x$ being subsequently restarted.

Figure 26:
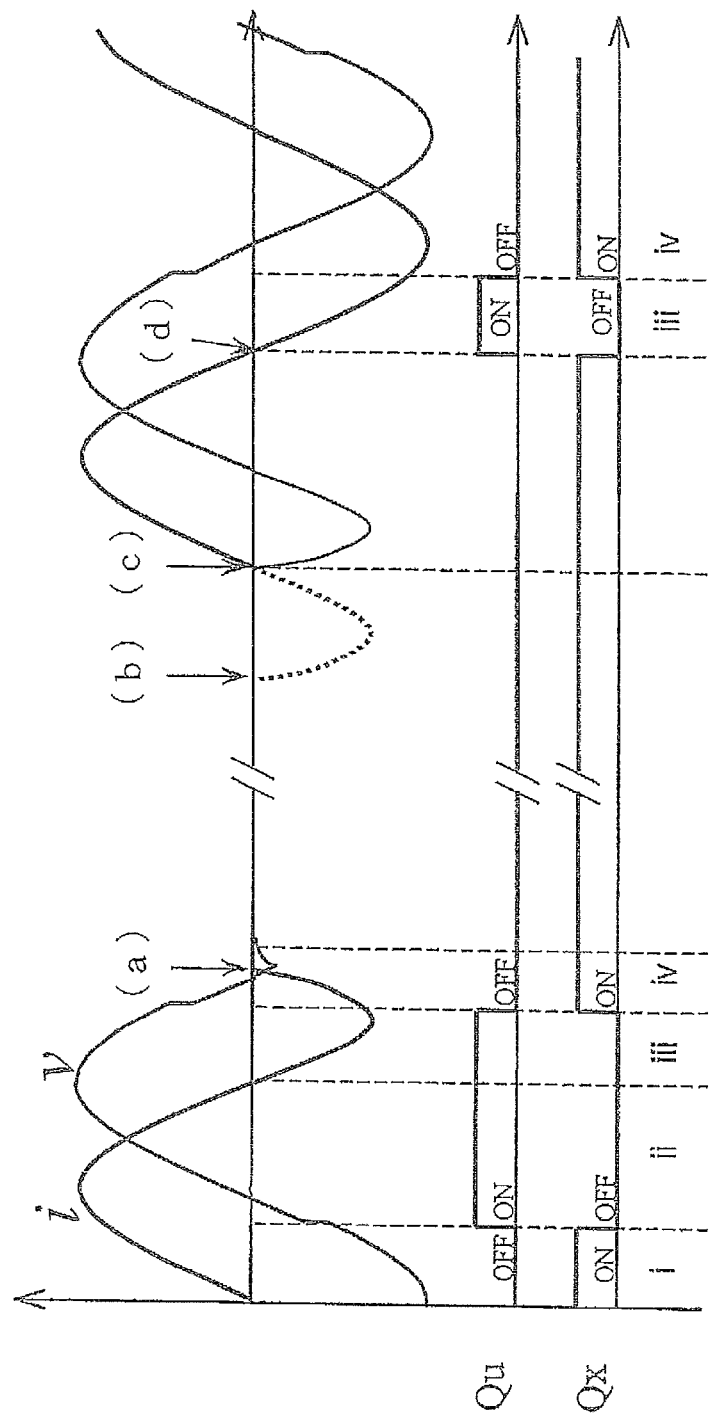
FIG. 26 is an operation illustration showing the fifth embodiment of the control method according to the invention.

FIG. 26, in the same way as FIG. 17, is an operation illustration showing the fifth embodiment of the control method according to the invention, and shows an operation waveform of the current i and voltage v, and drive signals of the semiconductor switches $Q_u$ and $Q_x$, from a stoppage to a restart of the power transfer from the primary side feeder wire 110. This control method is also applied to the eighth to eleventh embodiments of the contactless power transfer system shown in FIGS. 18, 21, 23, and 24, and a basic restarting method is essentially the same as the method illustrated in the operation illustration of FIG. 17.

That is, a stoppage of the power transfer from the power receiving coil 120 and a loss of the current i are detected at a timing (a) of FIG. 26, the switches $Q_u$ and $Q_x$ are put into the same control conditions as immediately before the current is lost, and those conditions are maintained. Next, on the power transfer being restarted at a timing (b), a resonant current attempts to flow along a path from the power receiving coil 120 through the resonant capacitor $C_y$ and smoothing capacitor $C_o$ to the diode $D_x$ (shown by a broken line in FIG. 26), but when the power receiving coil induced voltage when the power transfer is restarted is less than the direct current output voltage $V_o$, it is not possible for the current to flow along this path.

Next, on the polarity of the current i inverting at a timing (c), the current i starts to flow along a path from the power receiving coil 120 through the switch $Q_x$ to the resonant capacitor $C_y$. Then, on the polarity of the current i inverting at a timing (d), the control device 200 detects a zero-crossing of the current i, and enables a normal restarting by switching the switch $Q_u$ to an on condition and the switch $Q_x$ to an off condition, restarting switching actions the same as normal.

The invention can be utilized in various kinds of electrical or electronic instrument, electric vehicle, and the like, to which power is supplied in a contactless condition.

Finally, it is noted that while the present invention has been particularly shown and described with reference to preferred embodiments thereof, it will be understood by those skilled in the art that the foregoing and other changes in form and details can be made therein without departing from the spirit and scope of the present invention.

What is claimed is:

1. A contactless power transfer system, comprising:
a coil configured to supply or receive power contactlessly via magnetic coupling;
a bridge circuit having two direct current (DC) terminals and two alternating current (AC) terminals, the two AC terminals being respectively connected to two ends of the coil, the bridge circuit including two serially-connected circuits each having an upper arm and a lower arm, each of the upper and lower arms having a semiconductor switch and a diode in reverse parallel connection;
a smoothing capacitor connected between the two DC terminals of the bridge circuit, a load being connectable to either end of the smoothing capacitor;
a capacitor connected in parallel to the semiconductor switch of one of the upper and lower arms of the bridge circuit; and
a control device configured to generate drive signals to control the semiconductor switches of the bridge circuit, based on a DC output voltage of the bridge circuit and a current flowing through the coil,
wherein the drive signals include signals that put all of the semiconductor switches of the bridge circuit into an off condition during a period for which a power transfer to the coil is stopped, and that cause each of the semiconductor switches to carry out a switching action after a zero-crossing of the current of the coil is detected when power transfer to the coil is started.

2. The contactless power transfer system of claim 1, wherein the capacitor includes two capacitors respectively connected in parallel to the semiconductor switches of one of the upper arms and of one of the lower arms of the bridge circuit.

3. The contactless power transfer system of claim 1, further comprising another capacitor connecting one of the AC terminals to one of the two ends of the coil.

4. A contactless power transfer system control method for controlling switching actions of the semiconductor switches of the contactless power transfer system according to claim 1, the method comprising:
putting all of the semiconductor switches of the bridge circuit into an off condition during a period for which a power transfer to the coil is stopped; and
carrying out the switching action for each of the semiconductor switches of the bridge circuit after the zero-crossing of the current of the coil is detected when the power transfer to the coil is started.

5. A contactless power transfer system control method for controlling switching actions of the semiconductor switches of the contactless power transfer system according to claim 1, the method comprising:
putting the semiconductor switches of the upper arms or the lower arms of the bridge circuit into an on condition during a period for which a power transfer to the coil is stopped; and
carrying out the switching action for each of the semiconductor switches of the bridge circuit after the zero-crossing of the current of the coil is detected when the power transfer to the coil is started.

6. A contactless power transfer system control method for controlling switching actions of the semiconductor switches of the contactless power transfer system according to claim 1, the method comprising:
maintaining a same switching condition for each of the semiconductor switches of the bridge circuit as immediately before the current of the coil becomes zero due to a stop of a power transfer to the coil, during a period for which the power transfer to the coil is stopped; and
carrying out the switching action for each of the semiconductor switches of the bridge circuit after the zero-crossing of the current of the coil is detected when the power transfer to the coil is started.

7. A contactless power transfer system, comprising:
a coil configured to supply or receive power contactlessly via magnetic coupling;
a bridge circuit having two direct current (DC) terminals and two alternating current (AC) terminals, the two AC terminals being respectively connected to two ends of the coil, the bridge circuit including a first circuit having two serially-connected switching arms each including a semiconductor switch and a diode in reverse parallel connection, and a second circuit having two serially-connected diodes;
a smoothing capacitor connected between the two DC terminals of the bridge circuit, a load being connectable to either end of the smoothing capacitor; and
a control device configured to generate drive signals to control the semiconductor switches of the bridge circuit, based on a DC output voltage of the bridge circuit and a current flowing through the coil, wherein
a connection point of the two switching arms and a connection point of the two diodes form the two AC terminals of the bridge circuit,
connection points of the first circuit and the second circuit form the DC terminals of the bridge circuit, and
the drive signals include signals that put all of the semiconductor switches of the bridge circuit into an off condition during a period for which a power transfer to the coil is stopped, and that cause each of the semiconductor switches to carry out a switching action after a zero-crossing of the current of the coil is detected when power transfer to the coil is started.

8. The contactless power transfer system of claim 7, further comprising a capacitor connecting one of the AC terminals to one of the two ends of the coil.

9. A contactless power transfer system control method for controlling switching actions of the semiconductor switches of the contactless power transfer system according to claim 7, the method comprising:
   putting all of the semiconductor switches into an off condition during a period for which a power transfer to the coil is stopped; and
   carrying out the switching action for each of the semiconductor switches after the zero-crossing of the current of the coil is detected when the power transfer to the coil is started.

10. A contactless power transfer system control method for controlling switching actions of the semiconductor switches of the contactless power transfer system according to claim 7, the method comprising:
    maintaining a same switching condition for each of the semiconductor switches of the bridge circuit as immediately before the current of the coil becomes zero due to a stop of a power transfer to the coil during a period for which the power transfer to the coil is stopped; and
    carrying out the switching action for each of the semiconductor switches after the zero-crossing of the current of the coil is detected when the power transfer to the coil is started.

11. The contactless power transfer system according to claim 7, further comprising a capacitor connected in parallel to at least one of the semiconductor switches.

12. A contactless power transfer system control method for controlling switching actions of the semiconductor switches of the contactless power transfer system according to claim 11, the method comprising:
    putting all of the semiconductor switches into an off condition during a period for which a power transfer to the coil is stopped; and
    carrying out the switching action for each of the semiconductor switches after the zero-crossing of the current of the coil is detected when the power transfer to the coil is started.

13. A contactless power transfer system control method for controlling switching actions of the semiconductor switches of the contactless power transfer system according to claim 11, the method comprising:
    maintaining a same switching condition for each of the semiconductor switches of the bridge circuit as immediately before the current of the coil becomes zero due to a stop of a power transfer to the coil during a period for which the power transfer to the coil is stopped; and
    carrying out the switching action for each of the semiconductor switches after the zero-crossing of the current of the coil is detected when the power transfer to the coil is started.

14. A contactless power transfer system, comprising:
    a coil configured to supply or receive power contactlessly via magnetic coupling;
    a bridge circuit having two direct current (DC) terminals and two alternating current (AC) terminals, the two AC terminals being respectively connected to two ends of the coil, the bridge circuit including a first circuit having two serially-connected switching arms each including a semiconductor switch and a diode in reverse parallel connection, and a second circuit having two serially-connected resonant capacitors;
    a smoothing capacitor connected between the two DC terminals of the bridge circuit, a load being connectable to either end of the smoothing capacitor; and
    a control device configured to generate drive signals to control the semiconductor switches of the bridge circuit, based on a DC output voltage of the bridge circuit and a current flowing through the coil, wherein
    a connection point of the two switching arms and a connection point of the two resonant capacitors form the two AC terminals of the bridge circuit,
    connection points of the first circuit and the second circuit form the DC terminals of the bridge circuit, and
    the drive signals include signals that put all of the semiconductor switches of the bridge circuit into an off condition during a period for which a power transfer to the coil is stopped, and that cause each of the semiconductor switches to carry out a switching action after a zero-crossing of the current of the coil is detected when power transfer to the coil is started.

15. The contactless power transfer system of claim 14, further comprising a capacitor connecting one of the AC terminals to one of the two ends of the coil.

16. The contactless power transfer system according to claim 14, further comprising a capacitor connected in parallel to at least one of the semiconductor switches.

17. A contactless power transfer system control method for controlling switching actions of the semiconductor switches of the contactless power transfer system according to claim 14, the method comprising:
    putting all of the semiconductor switches into an off condition during a period for which a power transfer to the coil is stopped; and
    carrying out the switching action of each of the semiconductor switches after the zero-crossing of the current of the coil is detected when the power transfer to the coil is started.

18. A contactless power transfer system control method for controlling switching actions of the semiconductor switches of the contactless power transfer system according to claim 14, the method comprising:
    maintaining a same switching condition for each of the semiconductor switches of the bridge circuit as immediately before the current of the coil becomes zero due to a stop of a power transfer to the coil during a period for which the power transfer to the coil is stopped; and
    carrying out the switching action for each of the semiconductor switches after the zero-crossing of the current of the coil is detected when the power transfer to the coil is started.

* * * * *